United States Patent
Zhu et al.

(10) Patent No.: US 8,583,901 B2
(45) Date of Patent: Nov. 12, 2013

(54) REGISTER RENAMING SYSTEM USING MULTI-BANK PHYSICAL REGISTER MAPPING TABLE AND METHOD THEREOF

(75) Inventors: Peng Fei Zhu, Beijing (CN); Hong-Xia Sun, Beijing (CN); Yong Qiang Wu, Beijing (CN)

(73) Assignee: STMicroelectronics (Beijing) R&D Co. Ltd., Beijing (CN)

( * ) Notice: Subject to any disclaimer, the term of this patent is extended or adjusted under 35 U.S.C. 154(b) by 816 days.

(21) Appl. No.: 12/700,638

(22) Filed: Feb. 4, 2010

(65) Prior Publication Data

US 2010/0205409 A1 Aug. 12, 2010

(30) Foreign Application Priority Data

Feb. 4, 2009 (CN) .......................... 2009 1 0004886

(51) Int. Cl.
*G06F 9/30* (2006.01)
(52) U.S. Cl.
USPC ............................ 712/217; 712/216; 712/218
(58) Field of Classification Search
CPC ................................ G06F 9/384; G06F 9/3838
USPC .......................................... 712/216, 217, 218
See application file for complete search history.

(56) References Cited

U.S. PATENT DOCUMENTS

| | | | | |
|---|---|---|---|---|
| 5,446,912 A * | 8/1995 | Colwell et al. | ................. | 712/217 |
| 5,471,633 A * | 11/1995 | Colwell et al. | .................. | 712/23 |
| 5,974,240 A * | 10/1999 | Chan | .............................. | 712/218 |
| 5,974,524 A * | 10/1999 | Cheong et al. | .................. | 712/23 |
| 6,240,507 B1 | 5/2001 | Derrick et al. | | |
| 6,356,918 B1 * | 3/2002 | Chuang et al. | .......................... | 1/1 |
| 6,775,166 B2 * | 8/2004 | McKenzie et al. | .......... | 365/49.18 |
| 6,898,661 B2 * | 5/2005 | Mori et al. | ......................... | 711/5 |
| 7,428,631 B2 | 9/2008 | Rupley, II et al. | | |
| 7,467,129 B1 * | 12/2008 | Bong | .................................... | 1/1 |
| 7,506,139 B2 | 3/2009 | Burky et al. | | |
| 8,335,912 B2 * | 12/2012 | Golla et al. | ..................... | 712/222 |
| 2006/0239054 A1 * | 10/2006 | McKenzie et al. | .............. | 365/49 |
| 2007/0156380 A1 * | 7/2007 | Dalton | .............................. | 703/15 |
| 2009/0240875 A1 * | 9/2009 | Chu et al. | ....................... | 711/108 |
| 2010/0318998 A1 * | 12/2010 | Golla | ............................. | 718/104 |

FOREIGN PATENT DOCUMENTS

| | | |
|---|---|---|
| CN | 101169710 A | 4/2013 |
| EP | 1237072 B1 | 11/2010 |
| GB | 2442499 B | 2/2011 |

* cited by examiner

*Primary Examiner* — Aimee Li
(74) *Attorney, Agent, or Firm* — Seed IP Law Group PLLC

(57) ABSTRACT

Embodiments of a processor architecture utilizing multi-bank implementation of physical register mapping table are provided. A register renaming system to correlate architectural registers to physical registers includes a physical register mapping table and a renaming logic. The physical register mapping table has a plurality of entries each indicative of a state of a respective physical register. The mapping table has a plurality of non-overlapping sections each of which having respective entries of the mapping table. The renaming logic is coupled to search a number of the sections of the mapping table in parallel to identify entries that indicate the respective physical registers have a first state. The renaming logic selectively correlates each of a plurality of architectural registers to a respective physical register identified as being in the first state. Methods of utilizing the multi-bank implementation of physical register mapping table are also provided.

55 Claims, 19 Drawing Sheets

REGISTER RENAMING SYSTEM USING MULTI-BANK PHYSICAL REGISTER MAPPING TABLE AND METHOD THEREOF

BACKGROUND

1. Technical Field

This disclosure generally relates to the field of processor architecture and, more particularly, to register renaming in superscalar processors.

2. Description of the Related Art

In general, a processor is a device that can execute computer programs to carry out algorithmic computation, data permutation, etc. Microprocessors are a type of processor that incorporates most or all of the functions of a processor on a single integrated circuit. Superscalar microprocessors are microprocessors that can execute more than one instruction during a clock cycle by simultaneously dispatching multiple instructions to redundant execution resources, also known as functional units, in the processor. When executing instructions and micro-operations, processors typically read source operands from registers and store result or destination operands in registers. Registers are temporary storage units within the processor whose contents can be accessed more quickly than storage available elsewhere. Registers are typically used for holding arithmetic and other results used and generated by the processor. A given register contains a number of bits, e.g., 1 bit, 8 bits, 16 bits, or 32 bits.

A given register is typically addressable by a respective register identifier, such as a register number, an address, an offset, or in some other like manner. The respective register identifier is used in a program to identify a particular architectural register. That is, the given architectural register is a programming convention that virtually identifies or represents an underlying physical storage space such as a physical register.

Among the various techniques utilized in superscalar processors to allow parallel executions of instructions is register renaming. Because a program being executed by the processor often specifies fewer registers than can be implemented in hardware, a given superscalar processor implementation often has more physical registers than the number of architectural registers specified in the program. That is, in a superscalar processor implementation, there is not necessarily a one-to-one correspondence between an architectural register and a physical register.

In what is typically known as a register renaming stage, a number of general-purpose architectural registers used by a software program are correlated, or mapped, to a number of physical registers in the superscalar processor. For instance, in a superscalar processor that can issue up to four instructions for execution in parallel, up to four empty physical registers in a physical register file are available so that up to four architectural registers can be renamed every clock cycle.

The relationship between the correlated architectural registers and the corresponding physical registers is typically recorded in entries of a physical register mapping table (PRMT). Each entry of the PRMT records the state of a respective physical register in the physical register file, e.g., whether or not the respective physical register is empty and hence is available to store data for a correlated architectural register.

The architectural registers used by the decoded instructions of the program are correlated to respective physical registers, and the correlations are recorded in the PRMT. An identifier, e.g., an address, of each architectural register is also recorded in the PRMT. The identifier is typically recorded at the entry of the PRMT associated with the correlated physical register. The PRMT also records the state of each of the physical registers as well as the architectural register-to-physical register correlation/mapping information.

The state of each physical register that is allocated to store data for a correlated architectural register changes from one clock cycle to the next as program execution proceeds. The change in the state of the allocated physical register is tracked in the PRMT. The allocated physical register cannot be re-allocated to another architectural register until the current architectural register that the physical register is correlated to is released by the program instruction.

The use of a larger physical register file with more physical registers, such as an eighty-entry register file, is becoming more prevalent in superscalar processors. The use of a large number of physical registers helps reduce the occurrence of pipeline stall. In in some cases, pipeline stall is due to an instruction dependency encountered after the processor has permitted multiple instructions to be issued at a time. Accordingly, the number of entries in a PRMT increases as the number of physical registers increases.

In superscalar processors, a larger PRMT makes it more difficult to search and find entries indicating that the associated physical register is empty. The search and find algorithms typically take more time, logic, and energy with a larger PRMT than with a smaller PRMT. Additionally, implementing a larger PRMT has other challenges. For example, implementing a larger PRMT with traditional application-specific integrated circuit (ASIC) design methods and structures tends to require larger area for the circuits, increase path delay, and result in higher power consumption. Since path delay and power consumption are two factors to consider in processor design, and since both path delay and power affect performance, it is desirable to implement a larger PRMT for register renaming with minimal impact on performance.

BRIEF SUMMARY

In one aspect, a register renaming system to correlate architectural registers to physical registers includes a physical register mapping table having a plurality of entries and a renaming logic. Each entry of the mapping table is indicative of a state of a respective physical register. The mapping table has a plurality of non-overlapping sections each of which having respective entries of the mapping table. The renaming logic is coupled to search a number of the sections of the mapping table in parallel to identify entries each indicative of the respective physical register being in a first state. The renaming logic selectively correlates each of a plurality of architectural registers to a respective physical register identified as being in the first state.

In one aspect, a register renaming system to correlate architectural registers to physical registers includes a physical register mapping table having a plurality of entries, the plurality of entries configured as at least two non-overlapping sections of the physical register mapping table. Each entry in the physical register mapping table corresponds to a physical register, and each entry is configured to indicate that the corresponding physical register is in one of a plurality of states. A renaming logic is coupled to the physical register mapping table. The renaming logic is configured to search a number of the non-overlapping sections of the physical register mapping table in parallel, identify physical register mapping table entries that indicate the corresponding physical registers are in a first state, and selectively correlate each of a plurality of architectural registers to a respective plurality of physical registers identified as being in the first state.

In another aspect, a register renaming system in a processor includes a first bank of registers, a second bank of registers, and a search logic coupled to the first and the second banks of registers. Each register of the first bank stores a respective entry of a first section of a physical register mapping table that indicates one of a plurality of states of a respective physical register. Each register of the second bank stores a respective entry of a second section of the physical register mapping table that indicates one of the plurality of states of a respective physical register. The search logic searches the first and the second banks of registers in parallel to identify registers in the first and the second banks storing a respective entry of the mapping table indicative of the respective physical register being in a first state.

In another aspect, a register renaming system in a processor includes a first bank of registers, a second bank of registers, and a search logic. Each register of the first bank of registers is configured to store a respective entry of a first section of a physical register mapping table. Each respective entry of the first section is configured to store one state of a plurality of states, the one state indicative of a state of a respective physical register. The respective physical register corresponds to the respective entry of the first section. Each register of the second bank of registers is configured to store a respective entry of a second section of the physical register mapping table. Each respective entry of the second section is configured to store one state of the plurality of states, the one state indicative of a state of a respective physical register. The respective physical register corresponds to the respective entry of the second section. The search logic is coupled to the first and the second banks of registers. The search logic is configured to search the first and the second banks of registers in parallel and identify registers in the first and the second banks that are storing a respective entry of the physical register mapping table indicative of the respective physical register being in a first state In another aspect, a register renaming system to correlate architecture registers to physical registers includes a first bank of registers, a second bank of registers, a first inspection logic coupled to the first bank of registers, a second inspection logic coupled to the first bank of registers, a third inspection logic coupled to the second bank of registers, and a fourth inspection logic coupled to the second bank of registers. The first bank of registers stores a first portion of a physical register mapping table, with each register of the first bank storing a respective entry of the first portion of the mapping table. The second bank of registers stores a second portion of the physical register mapping table, with each register of the second bank storing a respective entry of the second portion of the mapping table. The first inspection logic is coupled to the first bank of registers to search the registers of the first bank from a first end of the first bank towards a second end of the first bank opposite to the first end in a first clock cycle to identify entries of the first portion of the mapping table each of which indicative of a respective physical register being empty. The second inspection logic is coupled to the first bank of registers to search the registers of the first bank from the second end of the first bank towards the first end of the first bank in the first clock cycle to identify entries of the first portion of the mapping table each of which indicative of a respective physical register being empty. The third inspection logic is coupled to the second bank of registers to search the registers of the second bank from a first end of the second bank towards a second end of the second bank opposite to the first end in the first clock cycle to identify entries of the second portion of the mapping table each of which indicative of a respective physical register being empty. The fourth inspection logic is coupled to the second bank of registers to search the registers of the second bank from the second end of the second bank towards the first end of the second bank in the first clock cycle to identify entries of the second portion of the mapping table each of which indicative of a respective physical register being empty.

In another aspect, a register renaming system to correlate architecture registers to physical registers includes a first bank of registers, a second bank of registers, a first inspection logic, a second inspection logic, a third inspection logic, and a fourth inspection logic. The first bank of registers is configured to store a first portion of a physical register mapping table. Each register of the first bank is configured to store a respective entry of the first portion of the physical register mapping table. The second bank of registers is configured to store a second portion of the physical register mapping table. Each register of the second bank is configured to store a respective entry of the second portion of the physical register mapping table. The first inspection logic is coupled to the first bank of registers.

The first inspection logic is configured to search the registers of the first bank from a first end of the first bank towards a second end of the first bank. The second end is opposite to the first end. The search is configured to occur in a first clock cycle. The search is operable to identify entries of the first portion of the physical register mapping table each of which is indicative of a respective first physical register being empty. The second inspection logic is coupled to the first bank of registers. The second inspection logic is configured to search the registers of the first bank from the second end of the first bank towards the first end of the first bank. The search is configured to occur in the first clock cycle, and the search is operable to identify entries of the first portion of the physical register mapping table each of which is indicative of a respective second physical register being empty. The third inspection logic is coupled to the second bank of registers. The third inspection logic is configured to search the registers of the second bank from a first end of the second bank towards a second end of the second bank. The second end is opposite to the first end. The search is configured to occur in the first clock cycle, and the search operable to identify entries of the second portion of the physical register mapping table, each of which is indicative of a respective third physical register being empty. The fourth inspection logic is coupled to the second bank of registers. The fourth inspection logic is configured to search the registers of the second bank from the second end of the second bank towards the first end of the second bank. The search is configured to occur in the first clock cycle, and the search is operable to identify entries of the second portion of the physical register mapping table, each of which is indicative of a respective fourth physical register being empty.

In one aspect, a processor includes a physical register mapping table, a search logic, and a mapping logic. The physical register mapping table has a plurality of entries, with each entry of the mapping table indicative of a state of a respective physical register. The search logic is coupled to search a plurality of sections of the mapping table in parallel to identify entries each of which indicative of the respective physical register being in a first state. Each section of the mapping table searched by the search logic has respective entries of the mapping table different from the entries of another section of the mapping table searched by the search logic. The mapping logic is coupled to the search logic and receives a number of architectural register identifiers each indicative of a respective architectural register. The mapping logic maps each received architectural register identifier to a respective entry in a respective section of the mapping table that indicates the respective physical table being in the first state.

In one aspect, a processor includes a physical register mapping table, a search logic, and a mapping logic. The physical register mapping table has a plurality of entries, each entry of the physical register mapping table is indicative of a state of a respective physical register. The search logic is coupled to the physical register mapping table. The search logic is configured to search a plurality of sections of the physical register mapping table in parallel. The search logic is operable to identify entries that are indicative of the respective physical register being in a first state. Each section of the physical register mapping table that is searched by the search logic is configured to have respective entries of the physical register mapping table different from the entries of another section of the physical register mapping table that is searched by the search logic. The mapping logic is coupled to the search logic. The mapping logic is configured to receive a number of architectural register identifiers. Each architectural register identifier is indicative of a respective architectural register. The mapping logic is operable to map each received architectural register identifier to a respective entry in a respective section of the physical register mapping table that indicates the respective physical register is in the first state.

In one aspect, a processor-based system includes an input device, an output device, a data storage device, and a processor coupled to the input device, the output device, and the data storage device. The processor includes a plurality of banks of registers, a search logic coupled to the banks of registers, and a mapping logic coupled to the banks of registers and the search logic. Each bank of registers stores a section of a physical register mapping table to store a respective entry of the mapping table in each register of a respective bank of registers, with each entry indicative of a state of a respective physical register. The search logic searches a first bank and a second bank of the banks of registers simultaneously to identify registers of the first bank and the second bank that store a respective entry indicative of the respective physical register being in a first state. The mapping logic receives a number of architectural register identifiers each identifying a respective architectural register, and maps each architectural register identifier to a respective one of the registers in the first bank and the second bank identified as storing a respective entry indicative of the respective physical register being in the first state to correlate each architectural register to a corresponding physical register.

In one aspect, a processor-based system includes an input device, an output device, and a data storage device. The processor includes a plurality of banks of registers, a search logic, and a mapping logic. Each bank of registers is configured to store a section of a physical register mapping table. The physical register mapping table is configured to store a respective entry of the physical register mapping table in each register of a respective bank of registers. Each entry of the physical register mapping table is indicative of a state of a respective physical register. The search logic is coupled to the banks of registers. The search logic is configured to search a first bank and a second bank of the banks of registers simultaneously. The search logic is further configured to identify registers of the first bank and the second bank that store a respective entry indicative of the respective physical register being in a first state. The mapping logic is coupled to the banks of registers and the search logic. The mapping logic is configured to receive a number of architectural register identifiers. Each architectural register identifier identifies a respective architectural register. The mapping logic is further configured to map each architectural register identifier to a respective one of the registers in the first bank and the second bank. The respective one of the registers in the first bank and the second bank is identified as storing a respective entry indicative of the respective physical register being in the first state. The mapping logic is operable to correlate each architectural register to a corresponding physical register.

In one aspect, a method of performing register renaming in a processor simultaneously searches a first section of a mapping table and a second section of the mapping table to identify entries of the mapping table each of which indicative a respective physical register being in a first state. For a number of architectural registers, the method stores data related to each of the architectural registers in a respective one of the physical registers identified as being in the first state to correlate the architectural registers to the physical registers identified as being in the first state.

In one aspect, a method of performing register renaming in a processor simultaneously searches a first section of a mapping table and a second section of the mapping table. The searching is operable to identify entries of the mapping table, each of which is indicative a respective physical register being in a first state. The method stores data for a number of architectural registers. The data is related to each of the number of architectural registers in a respective one of the physical registers identified as being in the first state. The storing is operable to correlate the number of architectural registers to the physical registers identified as being in the first state.

In another aspect, a method of performing register renaming in a processor stores entries of a physical register mapping table in a plurality of banks of registers to have a respective number of the entries stored in a respective one of the banks of registers, each of the entries indicative of a state of a respective physical register. The method also searches a first one of the banks of registers in a first direction and in a second direction different from the first direction in a first clock cycle to identify entries each of which indicative of the respective physical register being in a first state. The method further maps each of a plurality of architectural registers to a respective physical register identified as being in the first state.

In another aspect, a method of performing register renaming in a processor stores entries of a physical register mapping table in a plurality of banks of registers so that a respective number of the entries are stored in a respective one of the banks of registers, each of the entries indicative of a state of a respective physical register. The method also searches a first one of the banks of registers in a first direction and searches the first one of the banks in a second direction. The second direction is different from the first direction. The searching occurs in a first clock cycle. The searching identifies entries, each of which is indicative of the respective physical register being in a first state. The method further maps each of a plurality of architectural registers to a respective physical register identified as being in the first state.

In yet another aspect, a method of performing register renaming in a processor stores entries of a first section of a physical register mapping table in a first bank of registers and entries of a second section of the physical register mapping table in a second bank of registers. The method identifies entries of the physical register mapping table in the first bank each of which indicative of a respective physical register being empty in a first clock cycle. The method also identifies entries of the physical register mapping table in the second bank each of which indicative of a respective physical register being empty in the first clock cycle. A number of architectural registers to be renamed are grouped into a first group of architectural registers and a second group of architectural registers. The architectural registers of one of the groups of architectural registers are correlated to the identified empty physical registers associated with entries of the mapping table stored in the first bank. The architectural registers of the other group of architectural registers are correlated to the identified empty physical registers associated with entries of the mapping table stored in the second bank.

In yet another aspect, a method of performing register renaming in processor stores entries of a first section of a physical register mapping table in a first bank of registers and entries of a second section of the physical register mapping table in a second bank of registers. The method identifies entries of the physical register mapping table in the first bank, each of which entries is indicative of a respective physical register being empty, the identification occurring in a first clock cycle. The method also identifies entries of the physical register mapping table in the second bank, each of which entries is indicative of a respective physical register being empty, the identification occurring in the first clock cycle.

A first number of architectural registers to be renamed are grouped into a first group of architectural registers and a second number of architectural registers to be renamed are grouped into second group of architectural registers. The architectural registers of one of the first and second groups of architectural registers are correlated to the identified empty physical registers associated with entries of the physical register mapping table stored in the first bank. The architectural registers of the other group of the first and second groups of architectural registers are correlated to the identified empty physical registers associated with entries of the physical register mapping table stored in the second bank.

Figure 1A:
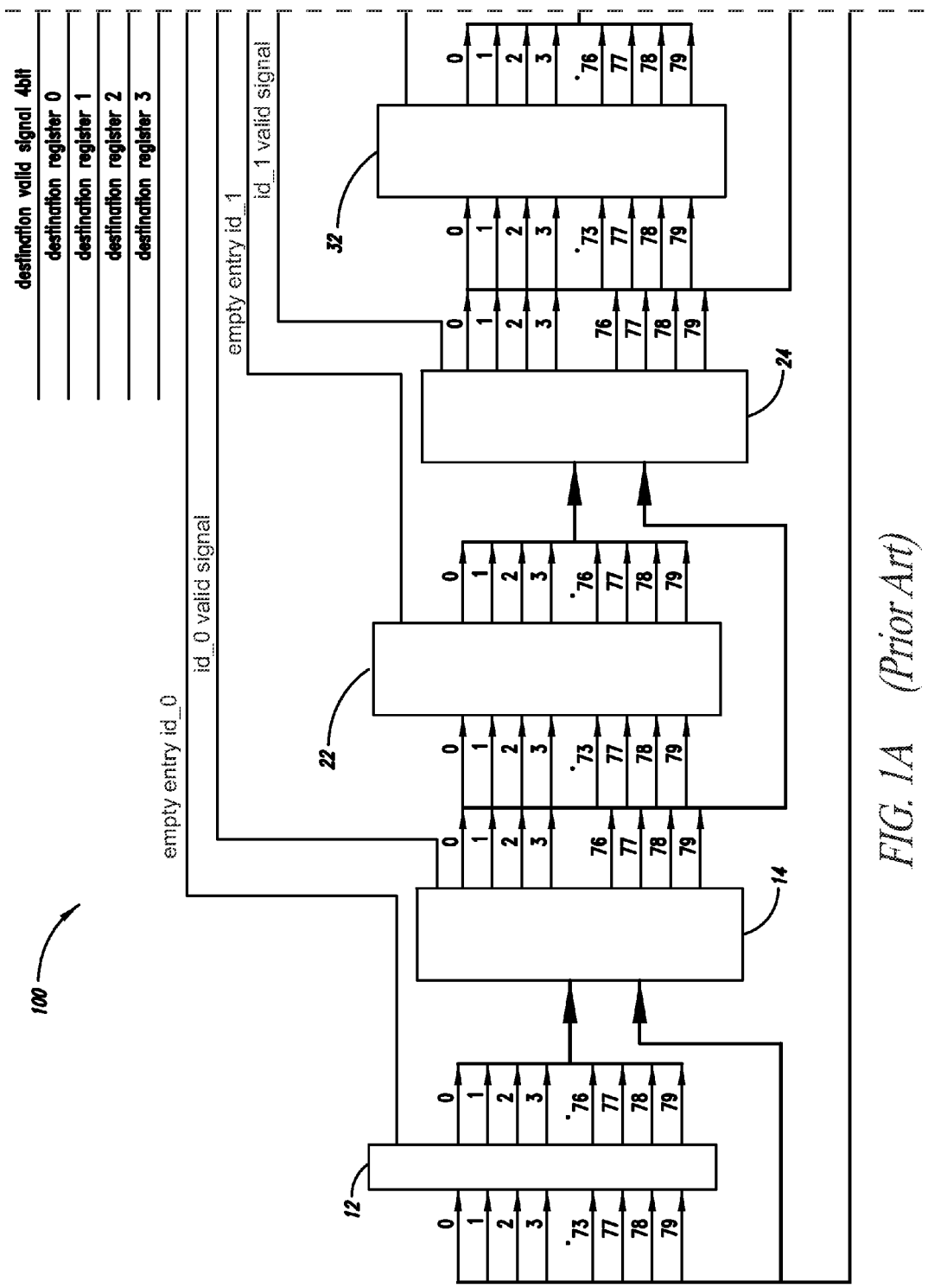
FIGS. 1A-1C are three sub-parts of a simplified diagram of a conventional register renaming system in a processor.

In the drawings, identical reference numbers identify similar elements or acts. The sizes and relative positions of elements in the drawings are not necessarily drawn to scale. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with register renaming systems, processors, and processor-based systems have not been shown or described in detail to avoid unnecessarily obscuring descriptions of the embodiments.

The elements illustrated in the figures and described herein may be expressed as being configured, adapted, arranged, organized, structured, operable, or otherwise formed to be capable of particular functions. The expression of the elements using these terms means that the referenced element comprises sufficient structure to be particularly capable of the named function.

Figure 1B:
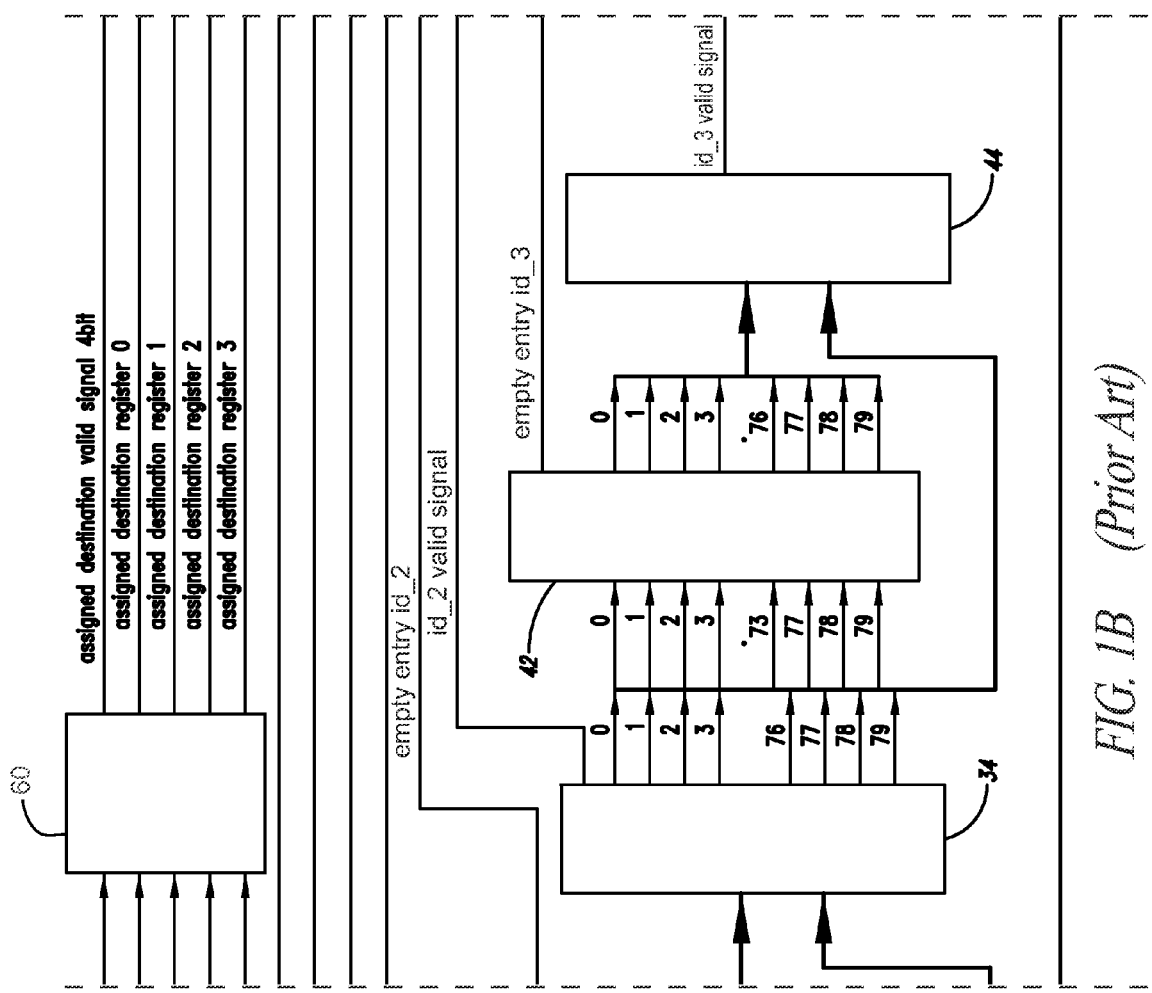
Figure 1C:
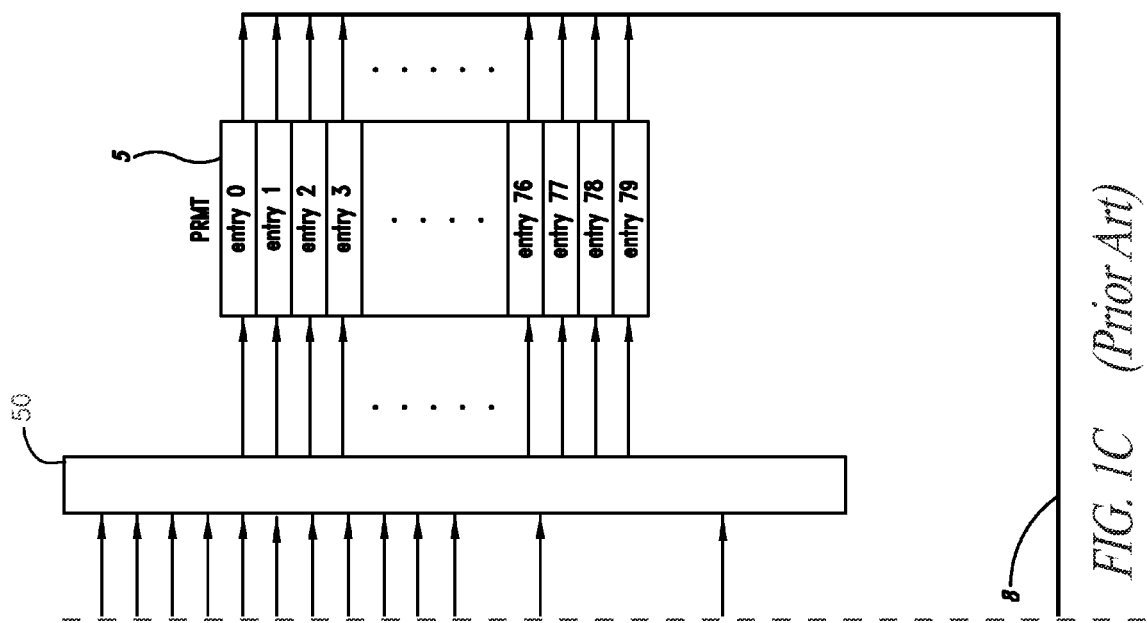

FIGS. 1A-1C illustrate a conventional register renaming system 100 in a processor. FIG. 1A is a left-most section of the renaming system 100, FIG. 1B is a center section, and FIG. 1C is a right-most section. FIGS. 1A-1C represent the conventional register renaming system 100 in a single illustration when the three sections of FIGS. 1A-1C are joined at the dashed lines. Accordingly, FIGS. 1A-1C are discussed herein as a single figure.

The register renaming system 100 includes a physical register mapping table (PRMT) 5. In the example shown in FIGS. 1A-1C, the PRMT 5 has eighty entries, i.e., entry 0 through entry 79, which correspond to eighty physical registers. The register renaming system 100 also includes four search modules 12, 22, 32, and 42, four corresponding mask-and-full detectors 14, 24, 34, and 44, a comparison-and-allocation module 50, and an architectural register assignment module 60. Entries of the PRMT 5 are stored in a bank of eighty registers, although the bank of registers is not shown to avoid unnecessarily obscuring the illustration.

The PRMT 5 is coupled to the search module 12 via an eighty-bit signal bus 8, where each signal carried by the signal bus 8 indicates a state of the respective physical register that is recorded in the respective PRMT entry. For example, if a physical register is empty, the respective entry of the PRMT 5 will indicate the state of the physical register being empty by storing a corresponding value. Likewise, if the physical register is not empty (e.g., in a state other than being empty), the respective entry of the PRMT 5 will indicate the state of the physical register being in a state other than empty by storing a value different from the value that indicates an "empty" state.

In operation, it takes five stages, or steps, for the register renaming system 100 to perform register renaming. During the first step, the search module 12 receives the eighty state signals from the PRMT 5 via the signal bus 8. The search module 12 searches entries 0-79 of the PRMT 5 for entries that indicate the respective physical register is empty. The mask-and-full detector 14 receives the eighty state signals from the signal bus 8 and the search result signals from the search module 12. Among those entries of the PRMT 5 that indicate the respective physical registers are in an empty state, one is chosen. The search module 12 sends a seven-bit empty entry ID signal, i.e., the empty entry id_0 signal as shown in FIGS. 1A-1C, to the comparison-and-allocation module 50. The physical register associated with the chosen entry will be allocated to one of the architectural registers that will be renamed.

The signal corresponding to the chosen entry is masked by the mask-and-full detector 14. The value of the signal is set to a value indicative of a state other than the "empty" state. The mask-and-full detector 14 also provides a new set of eighty signals to the search module 22 and the mask-and-full detector 24. By providing the new set of signals to the search module 22, the entry chosen by the search module 12 is rendered unavailable to be chosen in the subsequent steps.

If none of the entries of the PRMT 5 indicates a respective physical register being empty, the mask-and-full detector 14 sends a signal, i.e., the id_0 valid signal, to the comparison-and-allocation module 50 to indicate the physical registers are full. Alternatively, the mask-and-full detector 14 sends a signal, i.e., the id_0 valid signal, to the comparison-and-allocation module 50 to indicate the physical registers are not full.

In the second, third, and fourth steps, respectively, similar operations are carried out sequentially by the search module 22 and the mask-and-full detector 24, the search module 32 and the mask-and-full detector 34, and the search module 42 and the mask-and-full detector 44. During the time that the first through the fourth steps are carried out, the architectural register assignment module 60 receives the identifiers or addresses of up to four destination registers that will be correlated to physical registers. The architectural register assignment module 60 will assign an architectural register identifier to each of the up to four destination registers.

A four-bit signal, i.e., the destination valid signal shown in FIGS. 1A-1C, is provided to the architectural register assignment module 60 to indicate which ones of the signals received for the identifiers of the four destination registers are valid. A four-bit signal, i.e., the assigned destination valid signal shown in FIGS. 1A-1C, is provided to the comparison-and-allocation module 50 to indicate which ones of the four signals representing the four architectural register identifiers are valid. The assigned architectural register identifiers are provided to the comparison-and-allocation module 50.

In the fifth step, the valid architectural registers are correlated to the empty physical registers that were identified during the searches performed by the search modules 12, 22, 32, and 42 in the previous four steps.

Figure 2:
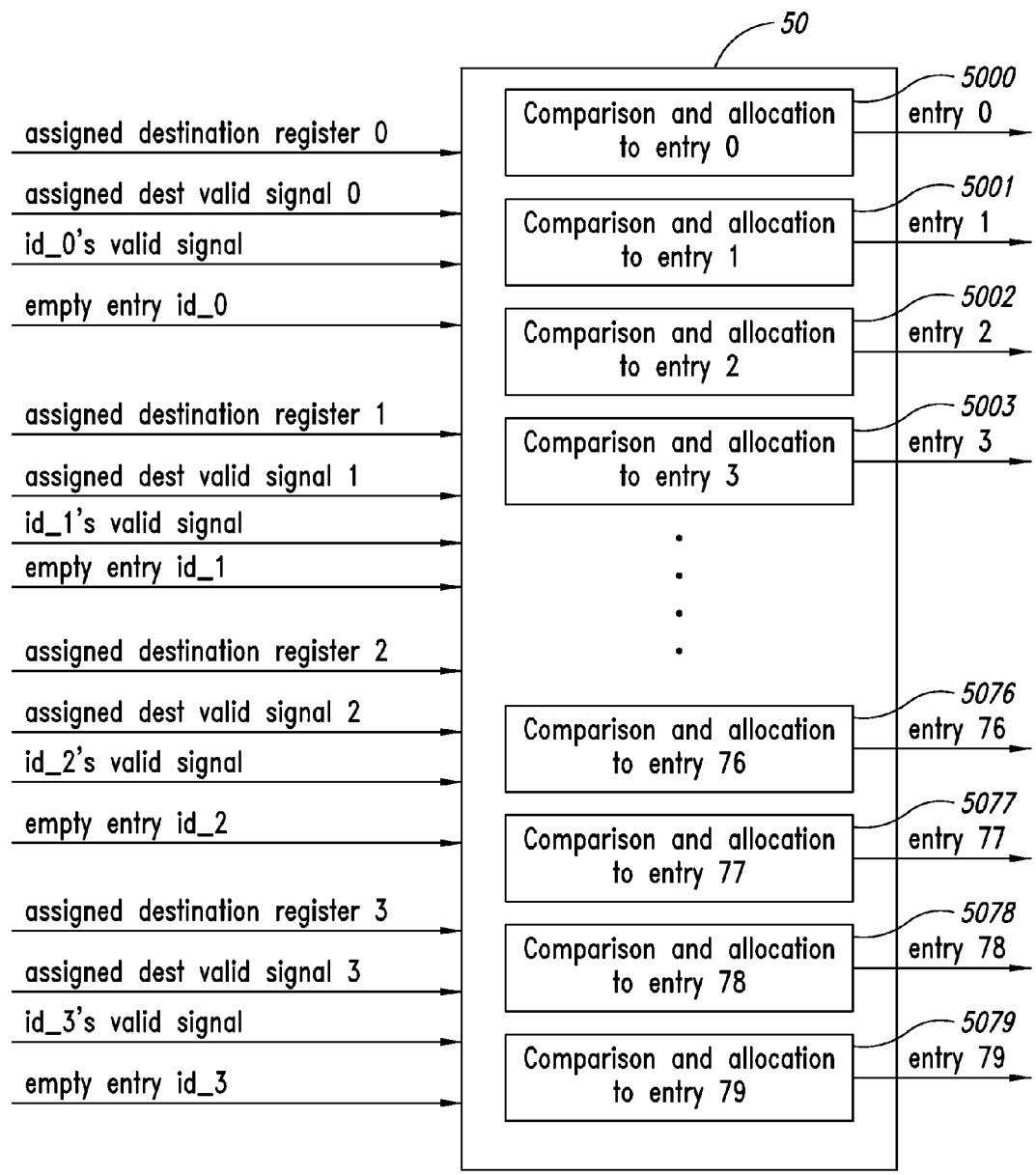
FIG. 2 is a simplified diagram of a portion of the conventional register renaming system of FIGS. 1A-1C.

As illustrated in FIG. 2, the comparison-and-allocation module 50 of FIGS. 1A-1C includes eighty comparison-and-allocation sub-blocks 5000-5079. Each of the comparison-and-allocation sub-blocks 5000-5079 corresponds to a respective one of the eighty physical registers. Each of the comparison-and-allocation sub-blocks 5000-5079 of the comparison-and-allocation module 50 compares all four empty entry ID signals (empty entry id_0, empty entry id_1, empty entry id_2, and empty entry id_3) with the value at a respective entry number of the PRMT 5 for a respective physical register. If a particular value in one of the four empty entry ID signals matches the PRMT 5 entry number that a comparison-and-allocation sub-block 5000-5079 is associated with, the comparison-and-allocation sub-block 5000-5079 allocates a valid architectural register identifier to that particular entry of the PRMT 5. The allocation of the valid architectural register correlates the respective architectural register to the respective physical register represented by the particular PRMT 5 entry.

Figure 3:
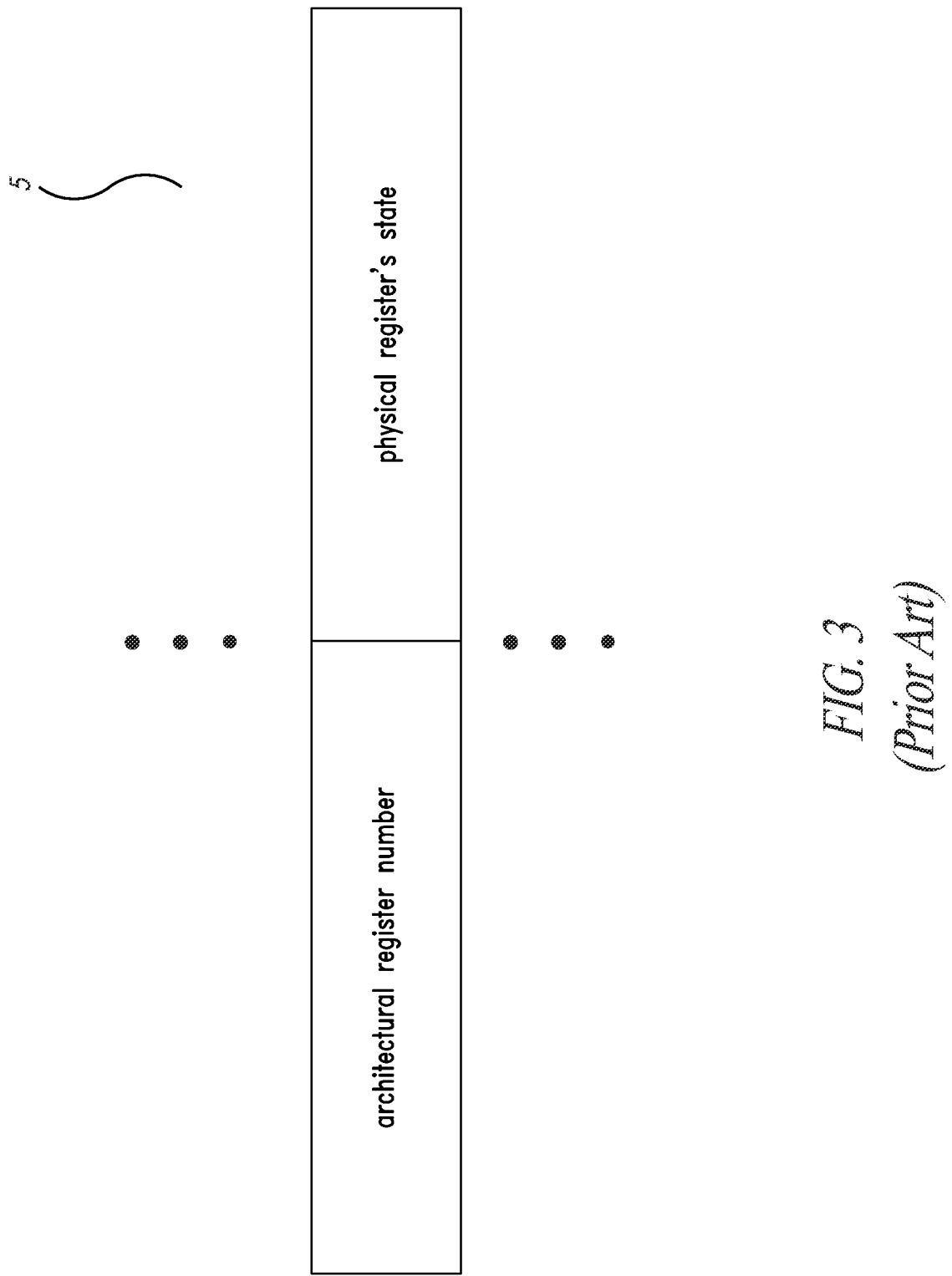
FIG. 3 is a diagram of an entry of a physical register mapping table of the conventional register renaming system of FIGS. 1A-1C.

The architectural register identifier is recorded in the particular entry of the PRMT 5. The state of the respective physical register is changed to a state other than "empty," such as "allocated." As shown in FIG. 3, each entry of the PRMT 5 records an architecture register identifier, e.g., an architecture register number, and the state of the respective physical register. For example, if a given physical register is in a first state of a plurality of states that the physical register can possibly be in, a first value indicative of the first state is recorded in the respective entry. Likewise, if the physical register is in a second state of the plurality of states, a second value indicative of the second state is recorded in the respective entry, and so forth.

From the foregoing description, several disadvantages associated with the conventional register renaming system 100 can be seen. A first disadvantage is a large delay caused by the large number of entries of the PRMT 5 to be searched by each of the search modules 12, 22, 32, and 42. A second disadvantage is a delay caused by the sequential searches of the search modules 12, 22, 32, and 42. That is, a subsequent search module cannot begin to search the entries until the preceding search module has finished the search. A third disadvantage is that each of the comparison-and-allocation sub-blocks 5000-5079 of the comparison-and-allocation module 50 includes four comparison circuits to perform three hundred and twenty (80 times 4) seven-bit comparisons. This design, which performs so many searches, consumes a high amount of power. Another disadvantage is that a register renaming system such as the register renaming system 100 shown in FIGS. 1A-1C requires a large area on an integrated-circuit chip. Thus, the register renaming system design of FIGS. 1A-1C is not suitable for applications that have a small size constraint.

Figure 4A:
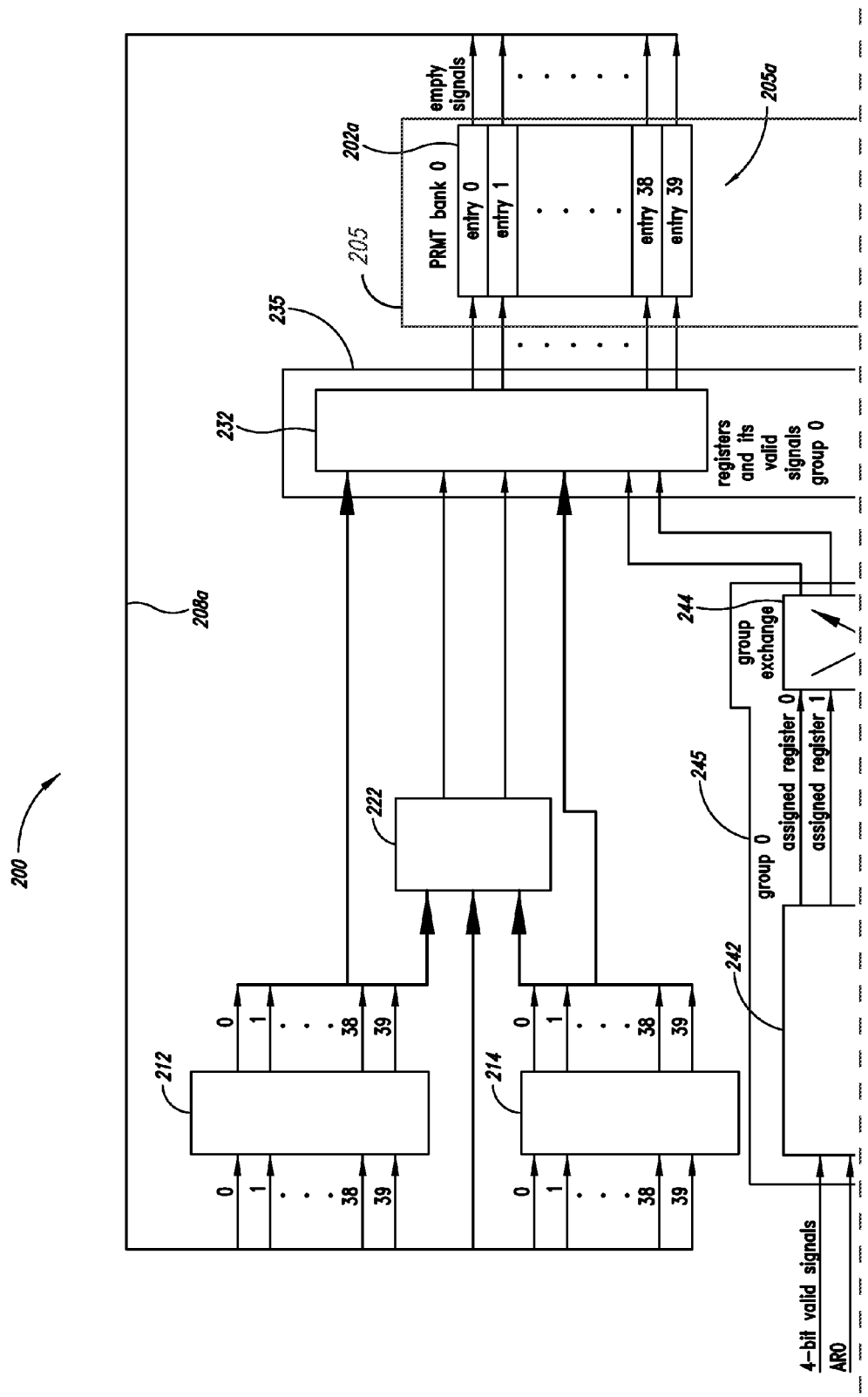
FIGS. 4A-4B are two sub-parts of a simplified diagram of a register renaming system in a processor according to one non-limiting embodiment.
Figure 4B:
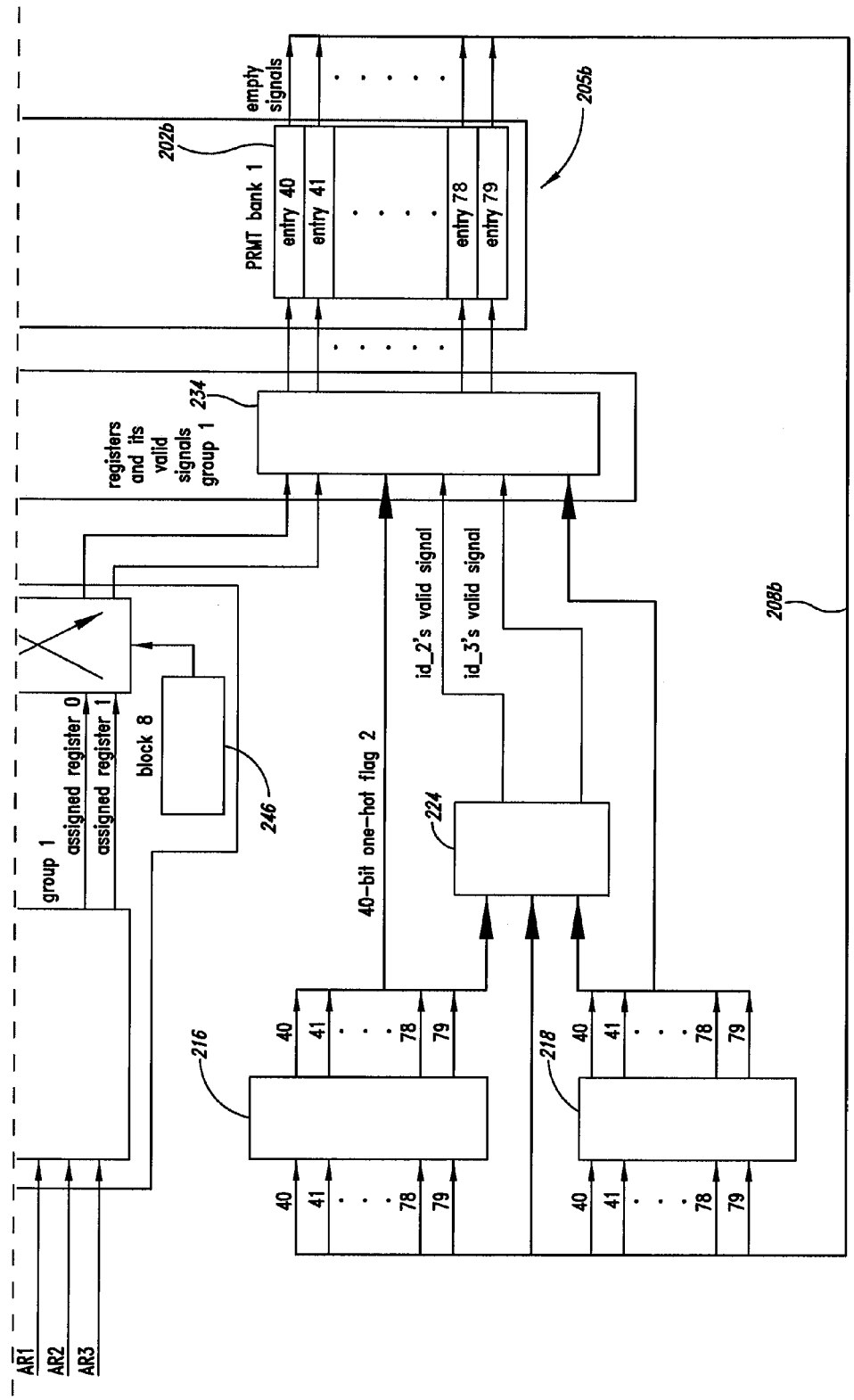

FIGS. 4A-4B illustrate a register renaming system 200 in a processor according to one embodiment of the invention. In the register renaming system 200, a PRMT 205 has multiple non-overlapping sections with each section stored in a respective bank of registers. FIG. 4A is a top-most section of the register renaming system 200, and FIG. 4B is a bottom-most section. FIGS. 4A-4B represent the register renaming system 200 in a single illustration when the two sections of FIGS. 4A-4B are joined at the dashed lines. Accordingly, FIGS. 4A-4B are discussed herein as a single figure.

Figure 5:
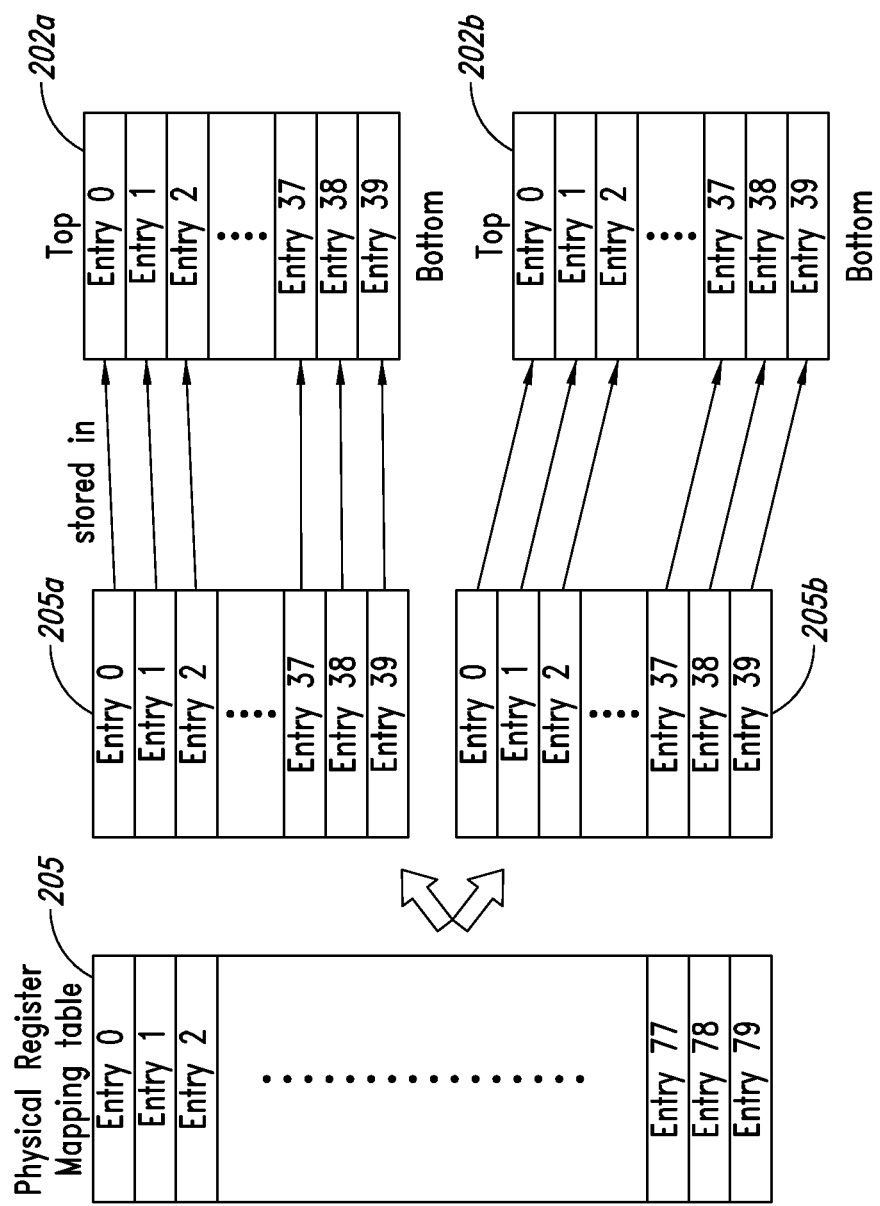
FIG. 5 is a simplified diagram of a physical register renaming table and storage thereof according to one non-limiting embodiment.

In one embodiment, as shown in FIG. 5, the PRMT 205 is configured as two non-overlapping sections, a first section 205a and a second section 205b. In this embodiment of PRMT 205, each of the sections 205a, 205b has half the number of the total entries in the PRMT 205. For example, the PRMT 205 may have eighty entries, entries 0-79. As shown in FIG. 5, the first forty of the entries of the PRMT 205, i.e., entries 0-39, may be in the first PRMT section 205a and stored in a first bank of forty registers 202a, e.g., bank 0.

Similarly, the next forty of the entries of the PRMT 205, i.e., entries 40-79, may be in the second PRMT section 205b and stored in a second bank of forty registers 202b, e.g., bank 1.

In other embodiments, the PRMT 205 may have more or less than two sections. For example, the PRMT 205 may comprise four non-overlapping sections in one embodiment, and may comprise eight non-overlapping sections in another embodiment. Regardless of the number of sections the PRMT 5 may have, in one embodiment the multiple sections of the PRMT 5 have an equal number of entries. Alternatively, the multiple sections of the PRMT 5 may have a different number of entries from one another.

In the register renaming system 200, at least some of the multiple sections of the PRMT 205 may be searched in parallel. That is, both sections 205a, 205b of the PRMT 205 may be searched simultaneously.

The term "simultaneous" is used herein in its broadest sense to include some but not complete overlap in operation or time. That is, "simultaneous" is broad enough to include "concurrent," "coincident," "coexistent," and the like. The searching, which is described as simultaneous, may be entirely simultaneous or only partially simultaneous. For example, a simultaneous search of section 205a may begin and end at the same time as a simultaneous search of section 205b. In another example, a simultaneous search of section 205a may begin and/or end at a different time as a simultaneous search of section 205b. In such a case, at least some part of the search of section 205a occurs at the same time as some part of the search of section 205b. Accordingly, a simultaneous search involves executing wholly or partially overlapping searches in multiple sections of the PRMT 205.

In embodiments where the PRMT 205 has more than two sections, two or more or all of the sections may be searched simultaneously. As shown in FIGS. 4A-4B, in one embodiment, four inspection logics, 212, 214, 216, and 218, are coupled to the banks of registers 202a, 202b. The four inspection logics, 212, 214, 216, and 218 determine the status of physical registers as indicated by the entries of the PRMT 205 stored in the banks of registers 202a, 202b. More specifically, the inspection logics 212, 214 are coupled to the first bank of registers 202a via a flag signal bus 208a. The inspection logics 216, 218 are coupled to the second bank of registers 202b via a flag signal bus 208b. Each of the flag signal bus 208a, 208b is forty-bit wide to accommodate the forty registers of the bank of registers 202a, 202b, respectively.

The flag signal buses 208a, 208b carry flag signals from the first and second banks of registers 202a, 202b to the inspection logics 212, 214, 216, 218. The inspection logics 212, 214, 216, 218 determine the status of the physical registers based on the value of the signals carried by the flag signal buses 208a, 208b. A flag signal may have a first value, e.g., a binary value of 1, when a respective PRMT entry stored in a register indicates the respective physical register is empty. The flag signal may have a second value, e.g., a binary value of 0, when the respective PRMT entry indicates the respective physical register is not empty.

The inspection logics 212, 214, 216, 218 search entries of the PRMT 5 stored in the first bank of registers 202a and the second bank of registers 202b. In one embodiment, the inspection logics 212, 214, 216, 218 search entries of the PRMT 5 in different directions to identify those entries of the PRMT 5 that indicate the respective physical registers are in a first state of a plurality of states, such as the empty state. For example, the inspection logic 212 may search for empty physical registers by reading the flag signals in a first direction. The first direction may correspond to reading the first bank of registers 202a from the top of the first bank 202a towards the bottom of the first bank 202a. Similarly, the inspection logic 214 may search for empty physical registers by reading the flag signals in a second direction different from the first direction. The second direction may correspond to reading the first bank of registers 202a from the bottom of the first bank 202a towards the top of the first bank 202a.

In other words, the inspection logic 212 first reads the flag signal from entry 0 of the PRMT 5, stored in the top register, labeled register 0, in the first bank of registers 202a, to determine whether the state of the respective physical register is empty. Next, the inspection logic 212 then reads the flag signal from entry 1 of the PRMT 5, and so on. In this manner, the flag signal from entry 39 of the PRMT 5, stored in the bottom register, labeled register 39, of the first bank of registers 202a, is the last flag signal to be read by the inspection logic 212.

In contrast, the inspection logic 214 first reads the flag signal from entry 39 of the PRMT 5, stored in the bottom register, labeled register 39, of the first bank of registers 202a. Next, the inspection logic 214 then reads the flag signal from entry 38 of the PRMT 5, and so on. Accordingly, the flag signal from entry 0 of the PRMT 5, stored in the top register, labeled register 0, of the first bank of registers 202a, is the last flag signal to be read by the inspection logic 214.

In a similar fashion, the inspection logic 216 may search for empty physical registers by reading the flag signals in the first direction. The first direction corresponds to reading the second bank of registers 202b from the top of the second bank 202b towards the bottom of the second bank 202b. Likewise, the inspection logic 218 may search for empty physical registers by reading the flag signals in the second direction. The second direction corresponds to reading the second bank of registers 202b from the bottom of the second bank 202b towards the top of the second bank 202b.

The inspection logic 216 first reads the flag signal from entry 40 of the PRMT 5, stored in the top register, labeled register 40, in the second bank of registers 202b, to determine whether the state of the respective physical register is empty. Next, the inspection logic 216 then reads the flag signal from entry 41 of the PRMT 5, and so on. The flag signal from entry 79 of the PRMT 5, stored in the bottom register, labeled register 79, of the second bank of registers 202b, is the last flag signal to be read by the inspection logic 216.

Conversely, the inspection logic 218 first reads the flag signal from entry 79 of the PRMT 5, stored in the bottom register, labeled register 79, of the second bank of registers 202b. Next, the inspection logic 218 then reads the flag signal from entry 78 of the PRMT 5, and so on. The flag signal from entry 40 of the PRMT 5, stored in the top register, labeled register 40, of the second bank of registers 202b, is the last flag signal to be read by the inspection logic 218.

Thus, multiple sections of the PRMT 205 may be searched in parallel and in different directions. Searching in parallel and in different directions provides an improvement in terms of reduced path delay over the sequential search implemented in the conventional register renaming system 100 described previously. Namely, rather than incurring serial path delay by having the entire PRMT 205 searched four separate times sequentially, the PRMT 205 is searched once with multiple sections of the PRMT 205 searched in parallel by the inspections logics 212, 214, 216, 218.

In one embodiment, each of the inspection logics 212, 214, 216, 218 may be a leading-one detection circuit. A leading-one detection circuit is a circuit that detects and identifies the first entry it comes across that indicates the respective physical register is empty. A leading-one detection circuit may detect and provide the identification even when there are more entries of the PRMT 205 that may indicate the respective physical registers are empty. Accordingly, up to four entries of the PRMT 205, each indicative of the respective physical register being empty, may be identified in parallel by the four inspection logics 212, 214, 216, 218.

As a result of the search to identify an empty physical register, each of the inspection logics 212, 214, 216, 218 provides a plurality of result signals. Each of the result signals indicates whether or not a respective entry of the PRMT 205 is identified as indicating the respective physical register is empty. For example, in the embodiment illustrated in FIGS. 4A-4B, each of the inspection logics 212, 214, 216, 218 provides forty result signals because each receives forty flag signals. In an embodiment, each of the inspection logics 212, 214, 216, 218 sets to a first value, e.g., a binary value of 1, the result signal corresponding to the first entry that it detects as indicating the respective physical register being empty. The inspection logics 212, 214, 216, 218 set the rest of the result signals to a second value, e.g., a binary value of 0. Accordingly, the inspection logics 212, 214, 216, 218 identify up to four registers in the banks 202a, 202b that store entries indicative of the respective physical registers being empty. Up to four architectural registers can be renamed to the identified up to four physical registers that are in the empty state.

In one embodiment, a full detector 222 is coupled to receive the result signals from the inspection logics 212, 214, and a full detector 224 is coupled to receive the result signals from the inspection logics 216, 218. Based on the result signals received from the inspection logics 212, 214, the full detector 222 outputs two valid signals, id_0's valid signal and id_1's valid signal.

Both of id_0's valid signal 0 and id_1's valid signal are set to a first value, e.g., a binary value of 1, if the result signals from the inspection logics 212, 214 indicate two empty physical registers are identified. If the result signals indicate only one empty physical register is identified, only id_0's valid signal is set to the first value while id_1's valid signal is set to a second value, e.g., a binary value of 0. If the result signals indicate no empty physical register is identified, then both id's_0 valid signal and id's_1 valid signal are set to the second value.

Similarly, based on the result signals received from the inspection logics 216, 218, the full detector 224 outputs two valid signals, id_2's valid signal and id_3's valid signal. Both of id_2's valid signal and id_3's valid signal 3 are set to the first value if the result signals from the inspection logics 216, 218 indicate two empty physical registers are identified. If the result signals indicate only one empty physical register is identified, only id_2's valid signal is set to the first value while id_3's valid signal is set to the second value. If the result signals indicate no empty physical register is identified, then both id_2's valid signal and id_3's valid signal are set to the second value.

In one embodiment, the register renaming system 200 may have an allocation logic 235 that is coupled between the banks of registers 202a, 202b and the inspection logics 212, 214, 216, 218 and the full detectors 222,224. In one embodiment, the register renaming system 200 may further include an assignment logic 245 that is coupled to the allocation logic 235.

The assignment logic 245 receives a plurality of architectural register identifiers, e.g., architectural register numbers. Each architectural register identifier identifies a respective architectural register to be renamed. In one embodiment, the assignment logic 245 groups each of the received architectural register identifiers into two groups of architectural register identifiers, a first group and a second group of architectural register identifiers. The assignment logic 245 further provides the first and second groups of architectural register identifiers to the allocation logic 235. In other words, each of the received architectural register identifiers is provided to the allocation logic 235 in either the first group or the second group. The allocation logic 235 then renames the architectural registers represented by the architectural register identifiers in the first group to the empty physical registers represented by the entries of the PRMT 205 stored in the first bank 202a. The allocation logic 235 further renames the architectural registers represented by the architectural register identifiers in the second group to the empty physical registers represented by the entries of the PRMT 205 stored in the second bank 202b. More specifically, as a result of register renaming, i.e., correlating the architectural registers to physical registers that are empty, the architectural register identifiers in the first group will be recorded in entries of the PRMT 205 that are stored in the first bank 202a, and the architectural register identifiers in the second group will be recorded in entries of the PRMT 205 that are stored in the second bank 202b.

As shown in FIGS. 4A-4B, four architectural register identifiers, AR0, AR1, AR2, and AR3, are received by the assignment logic 245. The four architectural register identifiers, AR0, AR1, AR2, and AR3 are provided to the allocation logic 235 as two groups of two architectural register identifiers. In one embodiment, the assignment logic 245 groups AR0, AR1 into a first group, e.g., group 0. The assignment logic 245 groups AR2, AR3 into a second group, e.g., group 1. The assignment logic 245 performs the grouping of AR0, AR1 to the first group, and AR2, AR3 to the second group in a given clock cycle. Subsequently, in the next clock cycle, the assignment logic 245 exchanges the grouping order to group AR0, AR1 into the second group and to group AR2, AR3 into the first group. The grouping and exchanged grouping repeats on each clock cycle.

Each of the two groups of architectural register identifiers is provided to the allocation logic 235 as two signals, assigned register 0 and assigned register 1. The assignment logic 245 may also receive a four-bit valid signal to indicate which one or ones of the four architectural registers represented by the architectural register identifiers AR0-AR3 need to be renamed. In one embodiment, if either of the two groups of architectural register identifiers has only one valid architectural register identifier, i.e., only one of the two architectural registers represented by the two identifiers in that group needs to be renamed, then that valid architectural register identifier will be provided to the allocation logic 235 as the assigned register 0 for that group.

In one embodiment, for the first group of the architectural register identifiers, the allocation logic 235 records a first architectural register identifier represented by the group 0 assigned register 0 signal. The allocation logic 235 records the first architectural register identifier in the entry of the PRMT 205 stored in the first bank 202a that is identified by the inspection logic 212. The allocation logic 235 also records a second architectural register identifier represented by the group 0 assigned register 1 signal. The allocation logic 235 records the second architectural register identifier in the entry of the PRMT 205 stored in the first bank 202a that is identified by the inspection logic 214.

Likewise, for the second group of the architectural register identifiers, the allocation logic 235 records a third architectural register identifier represented by the group 1 assigned register 0 signal. The allocation logic 235 records the third architectural register identifier in the entry of the PRMT 205 stored in the second bank 202b that is identified by the inspection logic 216. The allocation logic 235 also records a fourth architectural register identifier represented by the group 1 assigned register 1 signal. The allocation logic 235 records the fourth architectural register identifier in the entry of the PRMT 205 stored in the second bank 202b that is identified by the inspection logic 218.

For example, register 12 and register 27 are identified by the inspection logics 212, 214, respectively, as storing PRMT entries that indicate the respective physical registers are empty. In this example, AR0 will be recorded in entry 12, stored in register 12, and AR1 will be recorded in entry 27, stored in register 27. Such recordings will be made provided that both AR0 and AR1 are valid architectural register identifiers and provided that AR0 and AR1 are assigned to the first group in this particular clock cycle.

Similarly in the example, in the same clock cycle, both AR2 and AR3 are also valid architectural register identifiers. Also, register 55 and register 76 are identified by the inspection logics 216, 218, respectively, as storing an PRMT entries that indicate the respective physical registers are empty. In this example, AR2 will be recorded in entry 55 stored in register 55, and AR3 will be recorded in entry 76 stored in register 76.

In one embodiment, the assignment logic 245 may balance the number of valid architectural register identifiers assigned to each of the two groups in a given clock cycle. For example, during a clock cycle there are a total of three valid architectural register identifiers. One valid architectural register identifier is assigned to the first group, and the other two valid architectural register identifiers are assigned to the second group. In this example, during a subsequent clock cycle when there is an odd number of valid architectural register identifiers, the assignment logic 245 will assign more valid architectural register identifiers to the first group than are assigned to the second group.

In one embodiment, the assignment logic 245 may include a grouping circuit 242, an exchange circuit 244, and a bank selection circuit 246. The assignment logic 245 receives the four valid architectural register identifiers AR0-AR3 and the four-bit valid signal. The assignment logic 245 groups the architectural register identifiers into group 0 and group 1, and the assignment logic 245 further provides the two groups of architectural register identifiers to the exchange circuit 244.

Figure 6:
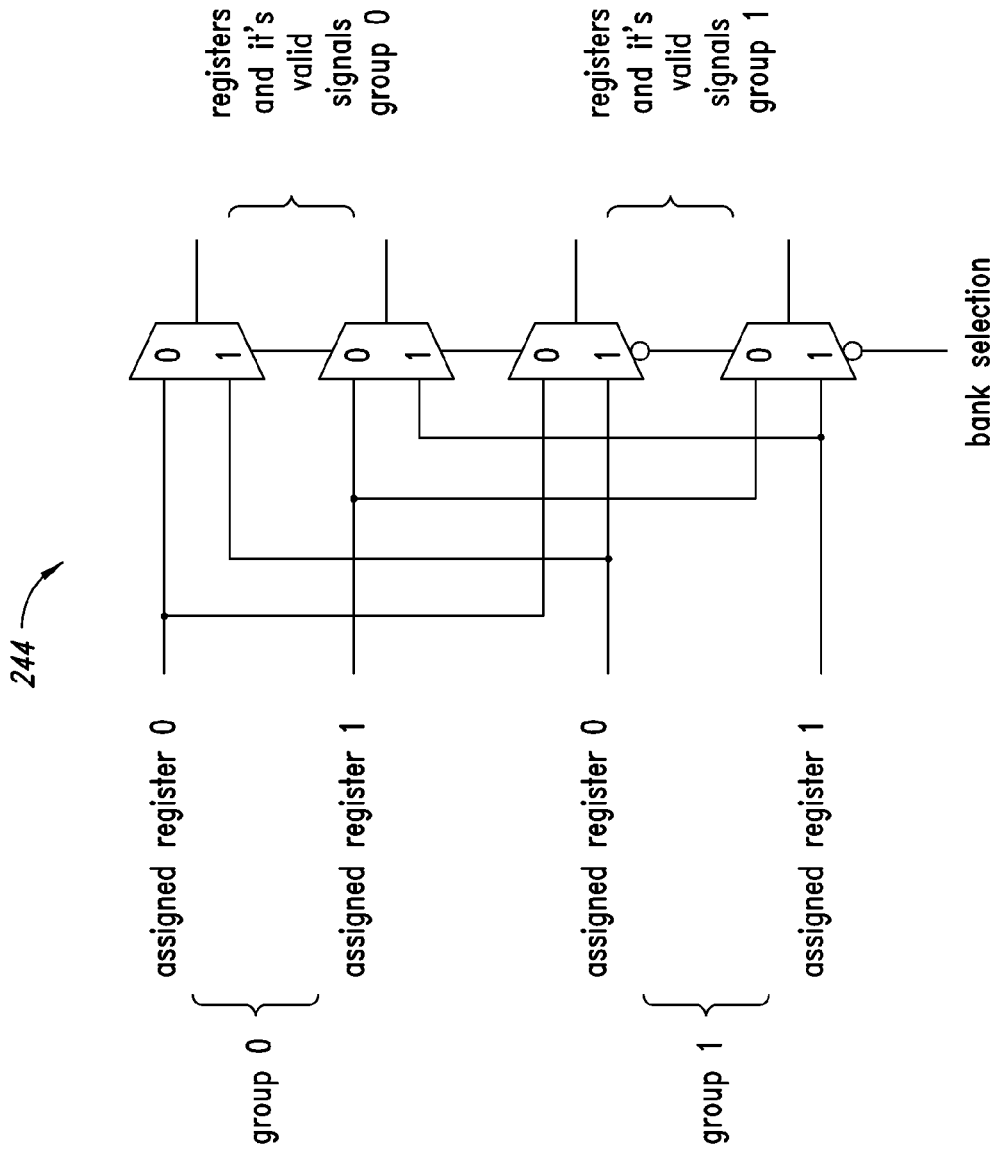
FIG. 6 is a simplified diagram of a portion of the register renaming system of FIGS. 4A-4B according to one non-limiting embodiment.

The exchange circuit 244 is illustrated in FIGS. 4A and 4B. FIG. 6 illustrates the exchange circuit 244 in more detail in accordance with one embodiment.

The exchange circuit 244 either formats group 0 for the first bank 202a and group 1 for the second bank 202b or the exchange circuit 244 formats group 0 for the second bank 202b and group 1 for the first bank 202a. The exchange circuit 244 determines which group will be assigned to each bank based on a bank selection signal from the bank selection circuit 246. Group 0 and group 1 are provided to the allocation logic 235 by the exchange circuit 244. The allocation logic 235 then provides the groups to the first bank 202a and the second bank 202b.

The bank selection circuit 246 may include a one-bit register or a multi-bit register. The bank selection circuit 246 is used when renaming the architectural registers. The bank selection circuit 246 is used to set the value of the bank selection signal to balance the usage of empty physical registers represented by entries in the first bank 202a and the second bank 202b. Either the bank selection circuit 246 or a balance control logic (not shown) may record the grouping history and set the bank selection signal, which is provided to the exchange circuit 244. The empty physical registers represented by the PRMT entries stored in the first bank 202a and the second bank 202b can thus be used for register renaming in a balanced manner. Otherwise, without such balanced assignment, it is possible that one of the banks 202a, 202b might not have any entry indicative of an empty physical register while the other of the banks 202a, 202b still has a number of entries indicative of the respective physical registers being empty. In one embodiment, the allocation logic 235 may include a first allocation logic 232 and a second allocation logic 234. The first allocation logic 232 may be coupled to the first bank of registers 202a, the inspection logics 212, 214, the full detector 222, and the assignment logic 245. The second allocation logic 234 may be coupled to the second bank of registers 202b, the inspection logics 216, 218, the full detector 224, and the assignment logic 245.

The first allocation logic 232 receives group 0 of architectural register identifiers from the allocation logic 235. Group 0 was grouped by the exchange circuit 244. The first allocation logic 232 then stores either one or both of the received architectural register identifiers, depending on whether one or both of the received architectural register identifiers is valid. The one or both of the received architectural register identifiers are stored in those entries of the PRMT 205 stored in the first bank 202a that indicate the respective physical registers as being empty.

The second allocation logic 234 receives group 1 of architectural register identifiers from the allocation logic 235. Group 1 was grouped by the exchange circuit 244. The second allocation logic 234 then stores either one or both of the received architectural register identifiers, depending on whether one or both of the received architectural register identifiers is valid. The one or both of the received architectural register identifiers are stored in those entries of the PRMT 205 stored in the second bank 202b that indicate the respective physical registers as being empty.

Figure 7A:
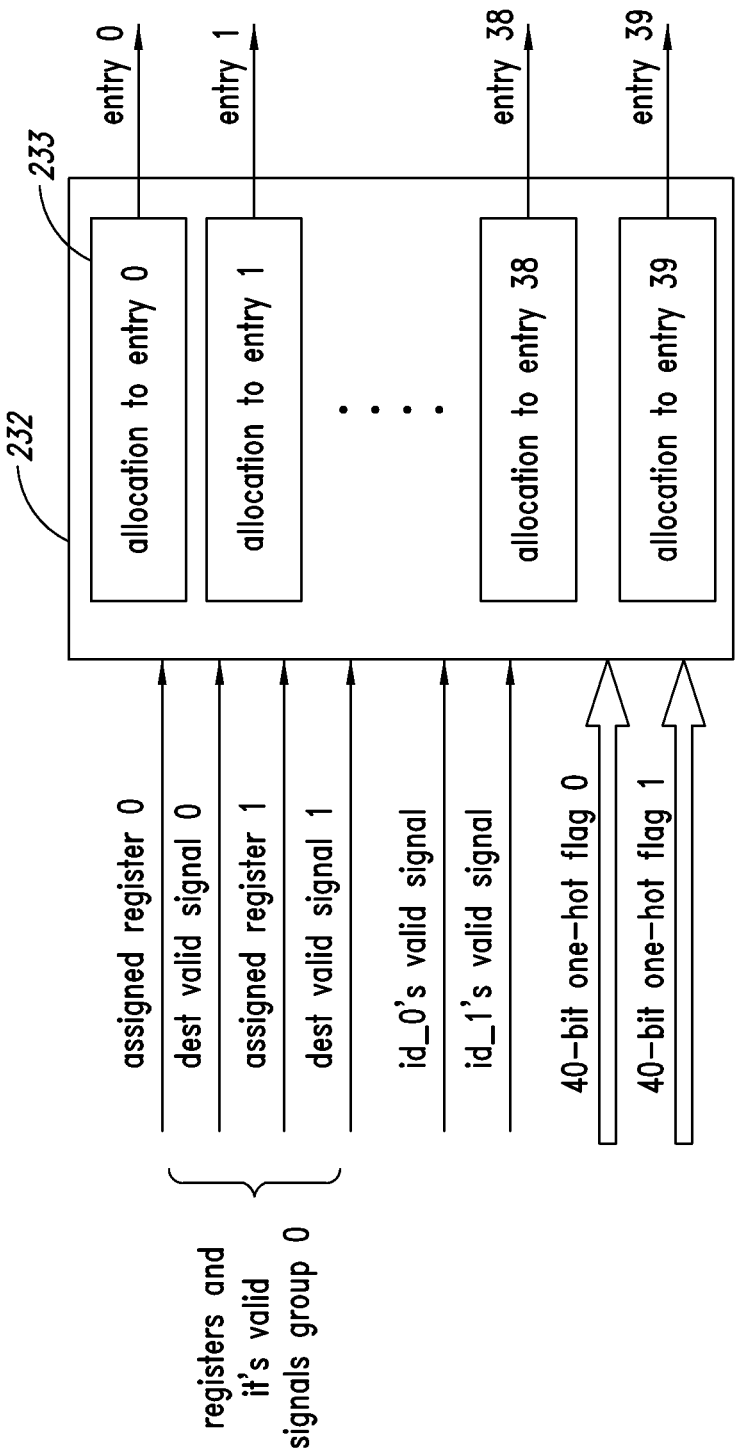
FIG. 7A is a simplified diagram of another portion of the register renaming system of FIGS. 4A-4B according to one non-limiting embodiment.
Figure 7B:
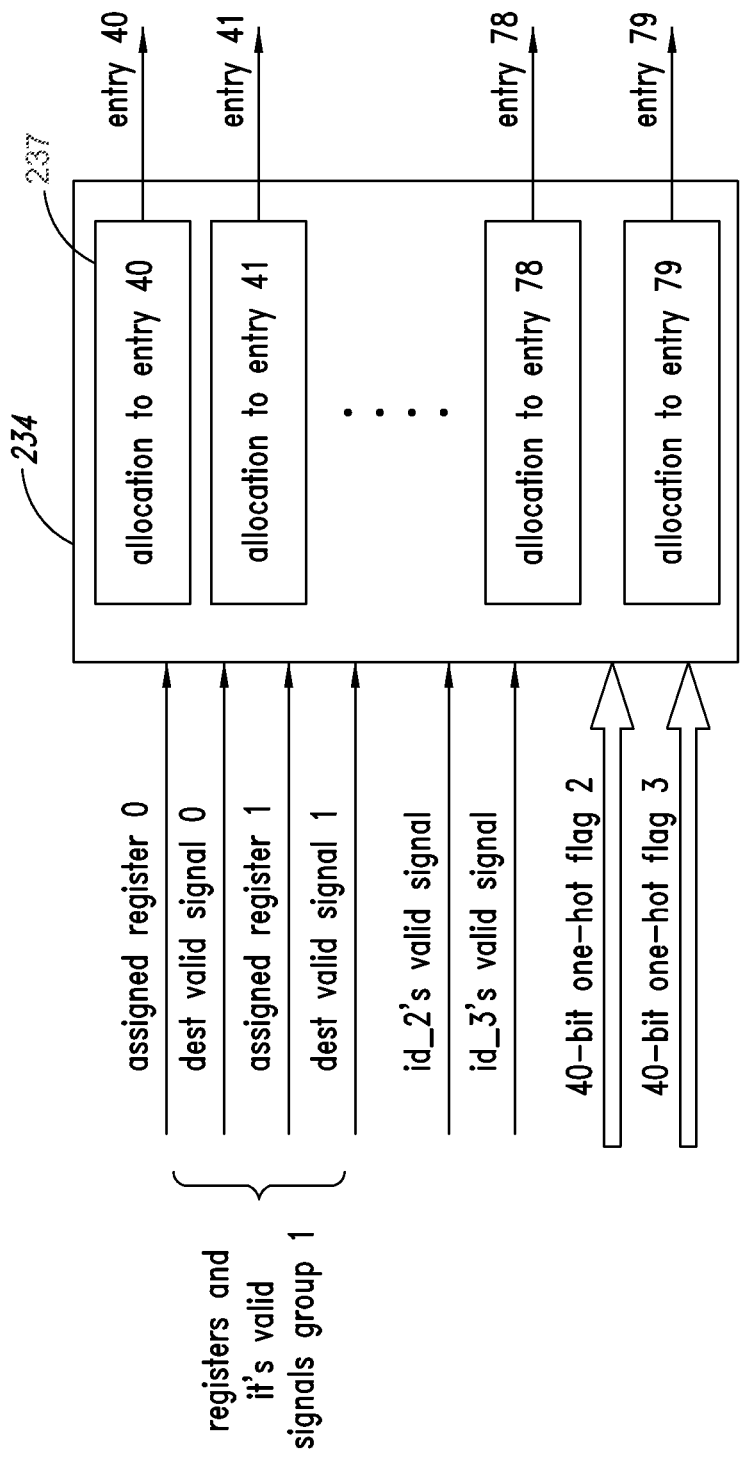
FIG. 7B is a simplified diagram of yet another portion of the register renaming system of FIGS. 4A-4B according to one non-limiting embodiment.

In one embodiment, each of the first allocation logic 232 and the second allocation logic 234 may have a number of allocation circuits 233, 237 respectively as shown in FIGS. 7A and 7B. FIG. 7A illustrates the first allocation logic 232 and FIG. 7B illustrates the second allocation logic 234 in accordance with an embodiment. In the embodiment, the forty allocation circuits 233 and the forty allocation circuits 237 each corresponds to a respective entry of the PRMT 205 stored in a respective register of the first bank 202a or the second bank 202b.

In one embodiment, the search result signal provided by the inspection logic 214 or inspection logic 216 may be used to control the selection between two architectural registers represented by the identifiers in the group assigned to the first bank 202a or second bank 202b. A received architectural register identifier will be recorded in an entry associated with a physical register that is in the empty state if the received architectural register identifier is valid. Otherwise, the received architectural register identifier will not be recorded.

Figure 8:
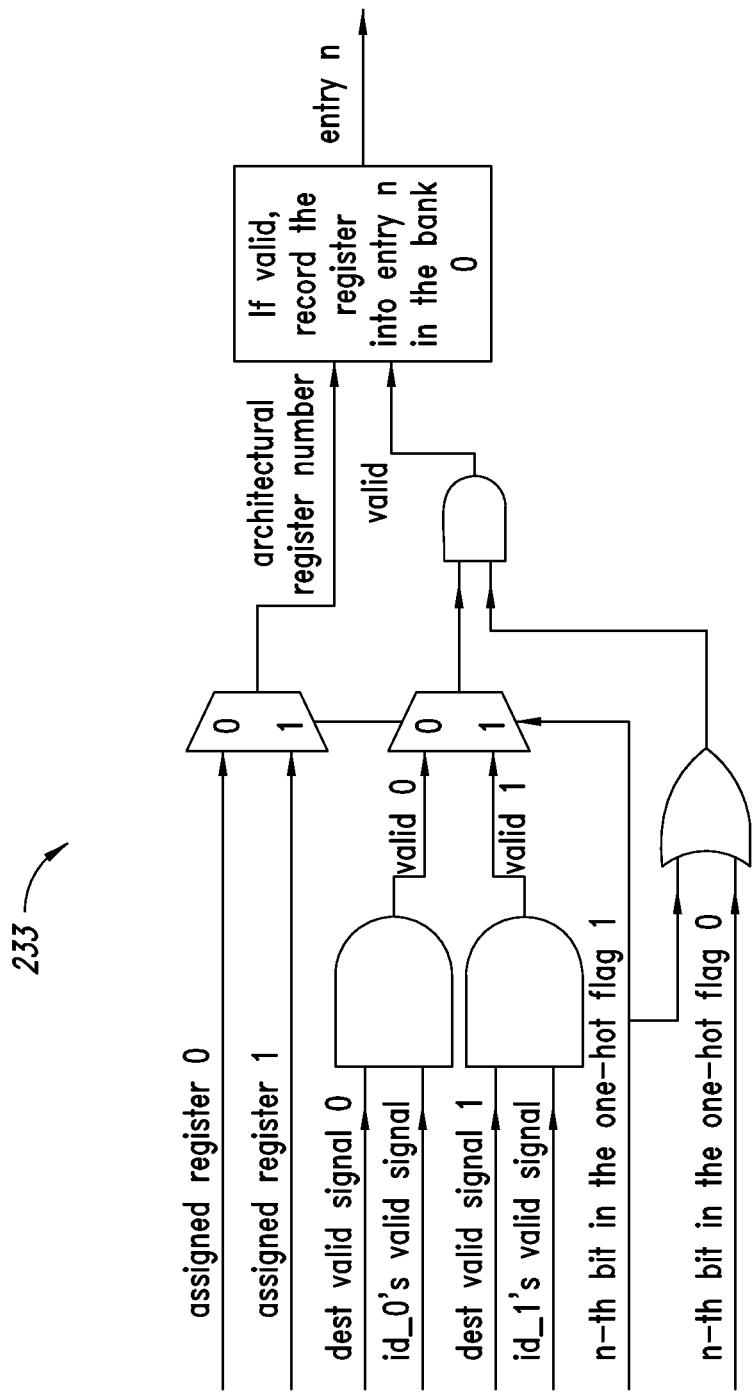
FIG. 8 is a simplified diagram of yet another portion of the register renaming system of FIGS. 4A-4B according to one non-limiting embodiment.

FIG. 8 illustrates the structure of one of the allocation circuits 233 in the allocation logic 232 in accordance with an embodiment. Other allocation circuits 237 in the allocation logic 234 are similarly constituted.

Thus, register renaming can be done in two steps with the register renaming system 200. Namely, two PRMT entries indicative of the respective physical registers as being in the empty state are first identified in each of the two PRMT sections 205a, 205b. Next, valid architectural registers, grouped into two groups, are renamed to respective empty physical registers associated with the identified entries in the two PRMT sections 205a, 205b. The identification of the entries associated with empty physical registers is performed simultaneously for both of the PRMT sections 205a, 205b.

The search is carried out in two directions simultaneously for each of the banks of registers 202a, 202b that store the PRMT sections 205a, 205b, respectively.

Figure 9:
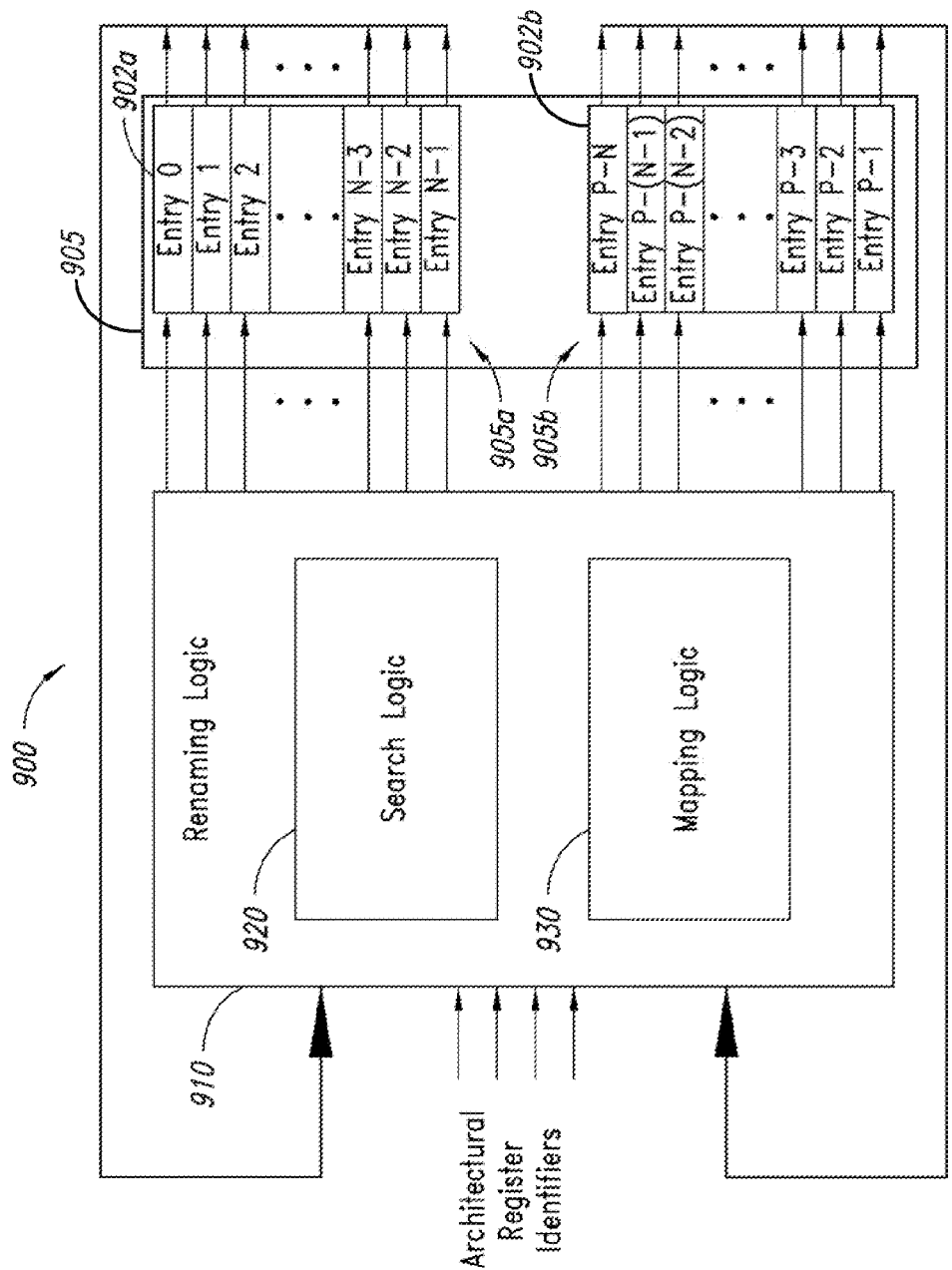
FIG. 9 is a simplified diagram of a register renaming system in a processor according to another non-limiting embodiment.

FIG. 9 illustrates a register renaming system 900 in a processor according to another non-limiting embodiment. The register renaming system 900 includes a PRMT 905 configured as a plurality of non-overlapping sections 905a, 905b each stored in a respective bank of registers 902a, 902b. Each entry of the PRMT 905 is associated with a respective physical register. Each entry of the PRMT 905 records the state that the respective physical register is in as well as the identifier of the architectural register renamed to the respective physical register, if any. The register renaming system 900 also includes a renaming logic 910 coupled to the banks of registers 902a, 902b to read and write to the registers. For example, the renaming logic 910 is operable to search for entries of the PRMT 905 that indicate the respective physical registers are in an empty state. The renaming logic 910 is further operable to rename architectural registers to some of the empty physical registers.

In one embodiment, as shown in FIG. 9, the register renaming system 900 may include a first PRMT section 905a stored in a first bank of registers 902a and a second PRMT section 905b stored in a second bank of registers 902b. The register renaming system 900 may also include a renaming logic 910 coupled to the banks of registers 902a, 902b. The renaming logic 910 may search the PRMT sections 905a, 905b in parallel to identify entries indicative of the respective physical register being in a first state, e.g., being empty. The renaming logic 900 may also selectively correlate each of a plurality of architectural registers to a respective physical register identified as being in the first state. Although only two PRMT sections 905a, 905b are shown in FIG. 9, in other embodiments there may be a different number of PRMT sections, e.g., four or eight, stored in an equal number of banks of registers. The PRMT sections 905a, 905b can be searched simultaneously.

In one embodiment, the renaming logic 910 may include search logic 920. Search logic 920 is operable to search the plurality of banks of registers, such as the banks of registers 902a, 902b, to identify entries stored therein that indicate the respective physical registers are in the first state. The search logic 920 may search each of the banks of registers in a first direction and simultaneously in a second direction different from the first direction. For example, the search logic 920 may search each of the banks 902a, 902b from the top of each bank towards the bottom of the bank, Simultaneously, search logic 920 may search each of the banks 902a, 902b from the bottom of each bank towards the top of the bank.

In one embodiment, the renaming logic 910 may include a mapping logic 930. The mapping logic 930 is operable to receive a plurality of architectural register identifiers each representative of a respective one of the architectural registers. The mapping logic 930 may selectively correlate each of the architectural register identifiers to a respective one of the entries of the PRMT 905. The correlated one of the entries of the PRMT 905 is indicative of the respective physical register being in the first state.

More specifically, the mapping logic 930 may selectively record each architectural register identifier in a respective architectural register entry of the PRMT 905. The respective architectural register entry is indicative of the respective physical register being in the first state. The mapping logic 930 may also change the state of the respective entry of the PRMT 905. That is, the mapping logic 930 may change a respective architectural register identifier entry from the first state to another state different than the first state.

In one embodiment, the mapping logic 930 may balance correlating architectural register identifiers to entries of each section of the mapping table 905a, 905b. In particular, the mapping logic 930 may adjust a respective quantity of architectural register identifiers to be correlated to entries of each section of the mapping table based on a respective quantity of architectural register identifiers previously correlated to entries of each section of the mapping table.

In one embodiment, the search logic 920 may be coupled to the mapping logic 930. The search logic 920 may be configured to provide a plurality of flag signals to the mapping logic 930. The flag signals may indicate whether or not a respective register of the banks of registers has a particular entry stored therein, the particular entry indicative of the respective physical register being in the first state. The mapping logic 930 may organize the architectural register identifiers into groups of architectural register identifiers. The mapping logic 930 may also correlate each group of architectural register identifiers to entries of a respective section of the mapping table in a first round of correlation. The mapping logic 930 may further correlate each group of architectural register identifiers to entries of a different section of the mapping table in a second round of correlation. The second round of correlation will occur after the first round of correlation. The second round of correlation is based on a respective quantity of architectural register identifiers correlated to entries of each section of the mapping table in the first round of correlation.

Figure 10:
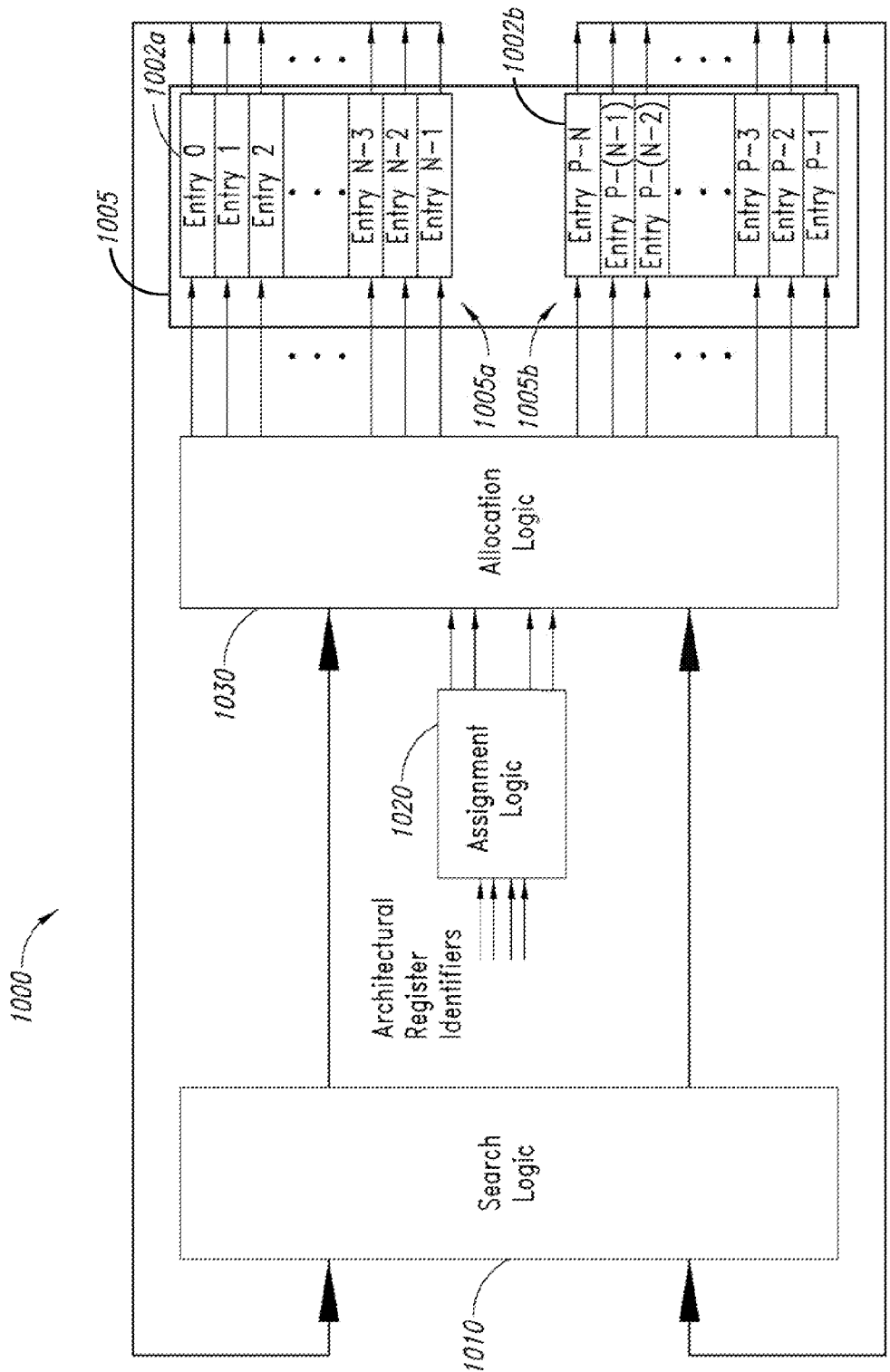
FIG. 10 is a simplified diagram of a register renaming system in a processor according to another non-limiting embodiment.

FIG. 10 illustrates a register renaming system 1000 in a processor according to another non-limiting illustrated embodiment. The register renaming system 1000 includes a PRMT 1005 having a plurality of non-overlapping sections 1005a, 1005b each stored in a respective bank of registers 1002a, 1002b. Each entry of the PRMT 1005 is associated with a respective physical register. Each entry of the PRMT 1005 records the state the respective physical register is in as well as the identifier of the architectural register renamed to the respective physical register, if any.

In one embodiment, as shown in FIG. 10, the register renaming system 1000 may include a first PRMT section 1005a stored in a first bank of registers 1002a and a second PRMT section 1005b stored in a second bank of registers 1002b. The register renaming system 1000 may also include a search logic 1010 coupled to the banks of registers 1002a, 1002b. The search logic 1010 may search the first and the second banks of registers 1002a, 1002b in parallel to identify registers in the banks storing a respective entry of the mapping table indicative of the respective physical register being in a first state, e.g., being empty. Although only two PRMT sections 1005a, 1005b are shown in FIG. 10, in other embodiments there may be a different number of PRMT sections, e.g., four or eight, stored in an equal number of banks of registers. The PRMT sections 1005a, 1005b can be searched simultaneously.

In one embodiment, the search logic 1010 may search the first bank of registers 1002a in a first direction. The search logic 1010 may also be configured to simultaneously search the first bank of registers 102a in a second direction different from the first direction. Simultaneously, the search logic 1010 may further search the second bank of registers 1002b in the first and the second directions. The search logic 1010 is configured to identify registers having a respective entry indicative of the respective physical register being in the first state. For example, the search logic 1010 may search the first bank of registers 1002a simultaneously from the top of the bank 1002a towards the bottom of the bank 1002a and from the bottom of the bank 1002a towards the top of the bank 1002a. The search logic 1010 may also search the second bank of registers 1002b in the same fashion. The search logic 1010 is configured, for example, to identify an entry in the particular bank; the entry indicating that the respective physical register is empty.

In one embodiment, the register renaming system 1000 may also include assignment logic 1020. Assignment logic 1020 is configured to receive and group a number of architectural register identifiers into first and a second groups of architectural register identifiers. Each architectural register identifier is representative of a respective architectural register. The assignment logic 1020 may provide the architectural register identifiers as the first and the second groups of architectural register identifiers so as to rename the architectural registers in two groups. Each of the received architectural register identifiers is in either the first group or the second group.

In one embodiment, the register renaming system 1000 may further include an allocation logic 1030 coupled to the first and the second banks of registers 1002a, 1002b, the search logic 1010, and the assignment logic 1020. The allocation logic 1030 may receive the first and the second groups of architectural register identifiers from the assignment logic 1020. The allocation logic 1030 may selectively correlate each of the architectural register identifiers to a respective one of the entries in the first bank of registers 1002a or the second bank of registers 1002b.

In one embodiment, the search logic 1010 may provide a plurality of flag signals to the allocation logic 1030. Each of the flag signals may have a first value to indicate the respective physical register has the first state. Alternatively, each of the flag signals may have a second value to indicate the respective physical register has another state other than the first state. The allocation logic 1030, upon receiving the flag signals from the search logic, may store each of the architectural register identifiers in a respective register of the first bank of registers 1002a or the second bank of registers 1002b. The respective flag signal that has the first value may direct the allocation logic to correlate the respective architectural register to the respective physical register.

In one embodiment, the allocation logic 1030 may correlate each of the architectural register identifiers in the first group to a respective one of the entries in the first bank of registers 1002a. The allocation logic 1030 may further correlate each of the architectural register identifiers in the second group to a respective one of the entries in the second bank of registers 1002b. In addition, the allocation logic 1030 may correlate each of the architectural register identifiers in the first group to a respective one of the entries in the second bank of registers 1002b. The allocation logic 1030 may further correlate each of the architectural register identifiers in the second group to a respective one of the entries in the first bank of registers 1002a. Such cross correlation may be employed in alternating or different clock cycles. For example, cross correlation may be used if a number of architectural register identifiers correlated to entries in the first bank 1002a is not equal to a number of architectural register identifiers correlated to entries in the second bank 1002b in a previous round of correlation.

In one embodiment, the search logic 1010 may determine the quantity of the registers identified as having a respective entry indicative of the respective physical register being in the first state. The search logic 1010 may further provide to the allocation logic 1030 a respective validity signal for each of the identified registers to the allocation logic 1030. For each of the first and the second banks of registers 1002a, 1002b, the allocation logic 1030 may receive a respective first and a respective second architectural register identifier. The allocation logic 1030 is configured to determine which of the received architectural register identifiers is to be correlated if only one entry stored in the respective bank of registers is identified as indicative of the respective physical register being in the first state.

Figure 11:
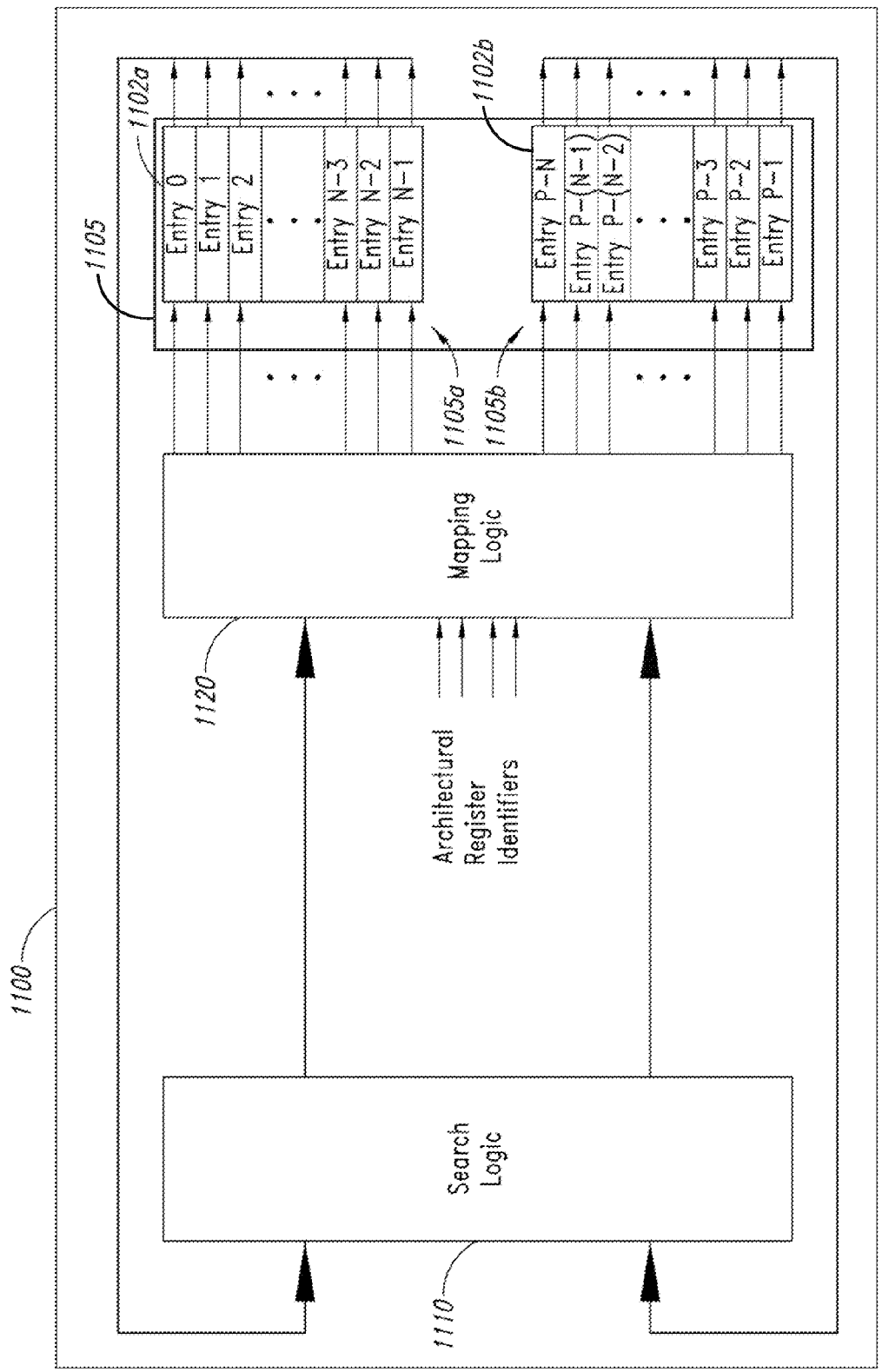
FIG. 11 is a simplified diagram of a processor having a register renaming system according to one non-limiting embodiment.

FIG. 11 illustrates a processor 1100 having a register renaming system according to one non-limiting illustrated embodiment. The processor 1100 includes a PRMT 1105 having a plurality of non-overlapping sections 1105a, 1105b each stored in a respective bank of registers 1102a, 1102b. Each entry of the PRMT 1105 is associated with a respective physical register. Each entry of the PRMT 1105 records the state the respective physical register is in, as well as the identifier of the architectural register renamed to the respective physical register, if any.

In one embodiment, as shown in FIG. 11, the processor 1100 may include a first PRMT section 1105a stored in a first bank of registers 1102a and a second PRMT section 1105b stored in a second bank of registers 1102b. The processor 1100 may also include a search logic 1110 coupled to the banks of registers 1102a, 1102b. The search logic 1110 may search the first and the second PRMT sections 1105a, 1105b in parallel to identify entries, each of which is indicative of the respective physical register being in a first state, e.g., being empty.

The processor 1100 may further include a mapping logic 1120 coupled to the search logic 1110. The mapping logic 1120 may receive a number of architectural register identifiers. Each architectural register identifier is indicative of a respective architectural register. The mapping logic 1120 may map each received architectural register identifier to a respective entry in a respective section of the PRMT 1105. The mapping logic 1120 will map the architectural register identifier to the respective PRMT 1105 entry that indicates the respective physical register is in the first state. Although only two PRMT sections 1105a, 1105b are shown in FIG. 11, in other embodiments there may be a different number of PRMT sections, e.g., four or eight, stored in an equal number of banks of registers. The PRMT sections 1105a, 1105b and can be searched simultaneously.

In one embodiment, the search logic 1110 is coupled to the banks of registers 1102a, 1102b. The search logic 1110 is configured to search each of the banks of registers 1102a, 1102b simultaneously. The search logic 1110 is configured to simultaneously search from a first end of the bank towards a second end of the bank opposite to the first end and from the second end of the bank towards the first end of the bank. The search logic 1110 is configured to look for registers storing entries of the mapping table indicative of the respective physical registers being in the first state. For example, the search logic 1110 may search the first bank of registers 1102a simultaneously from the top of the bank 1102a towards the bottom of the bank 1102a and from the bottom of the bank 1102a towards the top of the bank 1102a. The search logic 1110 may also search the second bank of registers 1102b in the same fashion.

In one embodiment, the search logic 1110 may provide a plurality of flag signals to the mapping logic 1120. Each of the flag signals is indicative of a search result for a respective register of the banks of registers. Each of the flag signals may have a first value to indicate the respective register stores a respective entry of the mapping table indicative of the respective physical register being in the first state. Alternatively, each of the flag signals may also have a second value to indicate the respective register stores a respective entry of the mapping table indicative of the respective physical register being in a second state, different from the first state.

In one embodiment, the search logic 1110 may include a plurality of register search logics. Each of the register search logics may be coupled to a respective one of the banks of registers 1102a, 1102b to simultaneously search the registers of the respective bank 1102a or 1102b. The simultaneous searching may be from a first end of the bank towards a second end of the bank opposite to the first end and from the second end of the bank towards the first end of the bank. The searching is performed to identify registers storing entries of the mapping table indicative of the respective physical registers being in the first state.

Figure 12:
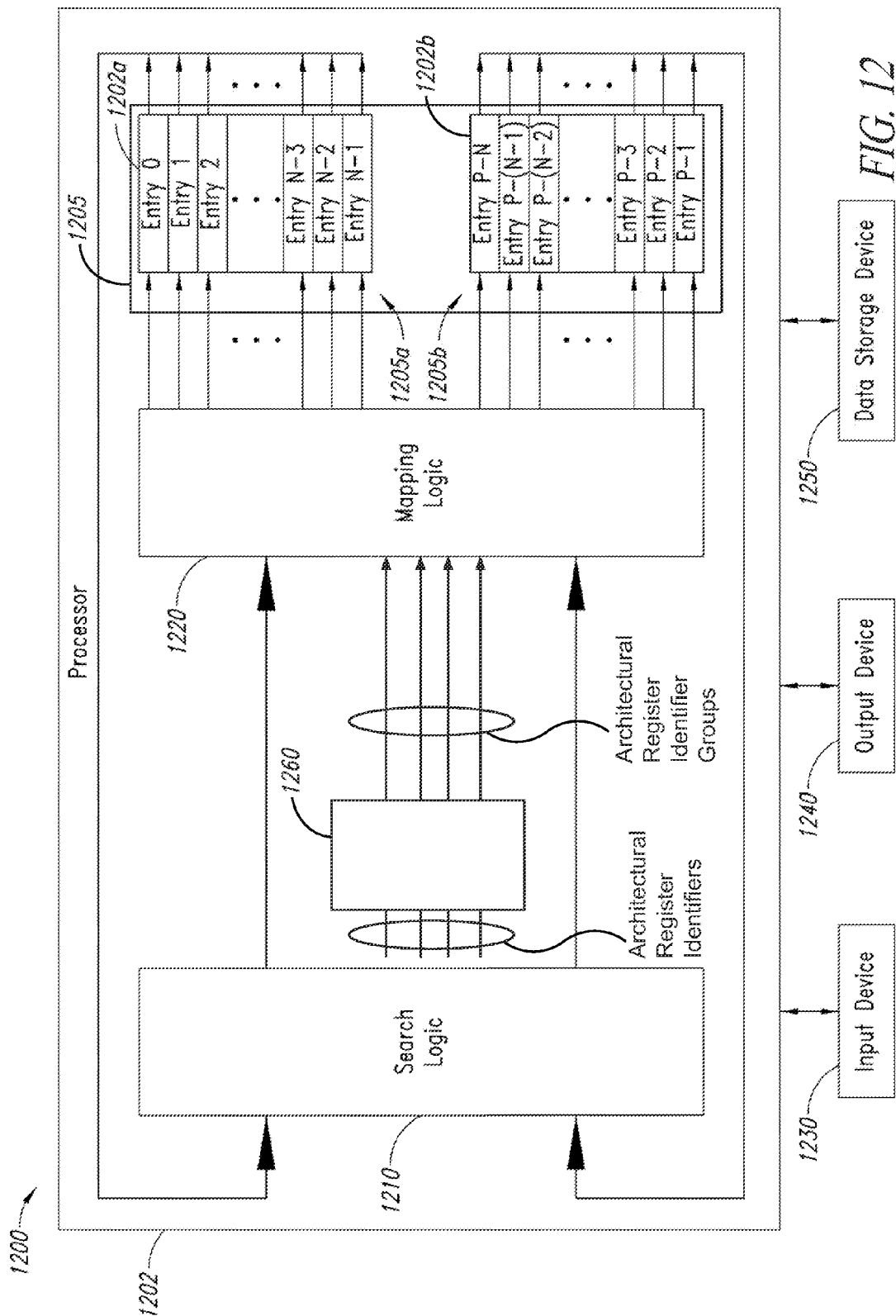
FIG. 12 is a simplified diagram of a processor-based system having a register renaming system according to one non-limiting embodiment.

FIG. 12 illustrates a processor-based system 1200 having a register renaming system according to one embodiment. The processor-based system 1200 includes an input device 1230, an output device 1240, a data storage device 1250, and a processor 1202 coupled to the input device 1230, the output device 1240, and the data storage device 1250. The processor 1202 includes a plurality of banks of registers 1202a, 1202b each storing a section 1205a, 1205b of a physical register mapping table (PRMT) 1205. The PRMT 1205 is configured to store a respective entry of the mapping table in each register of a respective bank of registers. Each entry of the PRMT 1205 is indicative of a state of a respective physical register.

In one embodiment, the processor 1202 may have a first bank of registers 1202a storing a first PRMT section 1205a and a second bank of registers 1202b storing a second PRMT section 1205b, as shown in FIG. 12. The processor 1202 also includes a search logic 1210 coupled to the banks of registers to search a first bank 1202a and a second bank 1202b of the banks of registers simultaneously. The search logic 1210 is configured to identify registers of the first bank 1202a and the second bank 1202b that store a respective entry indicative of the respective physical register being in a first state.

The processor 1202 further includes a mapping logic 1220 coupled to the banks of registers and the search logic 1210. The mapping logic 1220 receives a number of architectural register identifiers each identifying a respective architectural register. The mapping logic 1220 then maps each architectural register identifier to a respective one of the registers in the first bank 1202a and the second bank 1202b. The respective one of the registers is identified as storing a respective entry indicative of the respective physical register being in the first state to correlate each architectural register to a corresponding physical register.

In one embodiment, the search logic 1210 may simultaneously search at least one of the first and the second banks of registers 1202a, 1202b in a first direction and a second direction, the second direction different from the first direction. The search logic 1210 is configured to identify registers of the first bank 1202a and the second bank 1202b that store a respective entry indicative of the respective physical register being in the first state.

In one embodiment, the processor 1200 may further include an assignment logic 1260 coupled to the mapping logic 1220. The assignment logic 1260 may receive the architectural register identifiers, allocate the architectural register identifiers into a number of groups, and provide the architectural register identifiers in groups to the mapping logic 1220. The mapping logic 1220 may determine the number of architectural register identifiers mapped to each of the first and the second banks of registers 1202a, 1202b in each round of correlation. The mapping logic 1220 may then balance the number of architectural register identifiers mapped to each of the first and the second banks of registers 1202a, 1202b in each round of correlation based on the number of architectural register identifiers mapped to each of the first and the second banks of registers 1202a, 1202b in a previous round of correlation.

In one embodiment, the search logic 1210 may receive an empty signal for each register of the banks of registers. The empty signal indicates the state of the physical register associated with the respective entry of the mapping table stored in the respective register. In response, the search logic 1210 may provide a flag signal for each empty signal to indicate the state of the respective physical register. The flag signal may have a first value to indicate the respective physical register is in the first state or the flag signal may have a second value to indicate the respective physical register is in another state other than the first state. For example, for a given empty signal, the search logic 1210 may set the flag signal to a binary value of 1 to indicate the respective physical register is empty. Alternatively, the search logic 1210 may set the flag signal to a binary value of 0 to indicate the respective physical register is not empty e.g., in a commit state or write-back state.

Figure 13:
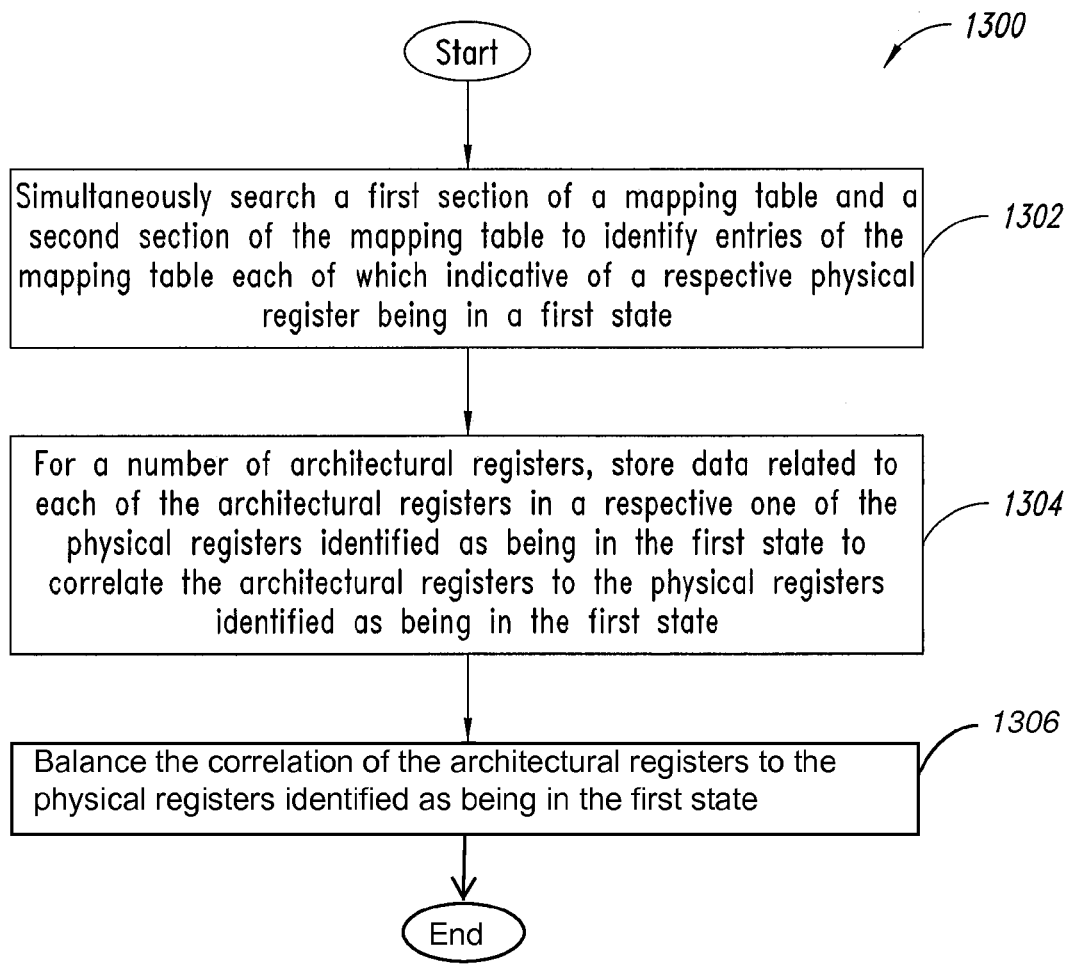
FIG. 13 is a flow chart illustrating a process of performing register renaming in a processor according to one non-limiting illustrated embodiment.

FIG. 13 illustrates a process 1300 of performing register renaming in a processor according to one embodiment. At 1302, a first section of a mapping table and a second section of the mapping table are simultaneously searched to identify entries of the mapping table each of which indicates a respective physical register being in a first state. In one embodiment, the first and second sections of the mapping table are searched sequentially or as directed by the program. In other embodiments, the first and second sections of the mapping table are simultaneously searched. At 1304, for a number of architectural registers, data related to each of the architectural registers is stored in a respective one of the physical registers identified as being in the first state to correlate the architectural registers to the physical registers identified as being in the first state.

In one embodiment, at 1306, the process 1300 may additionally balance the correlation of the architectural registers to the physical registers identified as being in the first state. The balancing may take place in each round of correlation based on the correlation of the architectural registers to ones of the physical registers identified as being in the first state in a previous round of correlation.

In one embodiment, the process 1300 may first determine the quantity of architectural registers correlated to physical registers that are related to each section of the mapping table for each round of correlation. The process 1300 may then adjust the quantity of architectural registers to be correlated to physical registers related to each section of the mapping table based on the quantity of architectural registers correlated to physical registers related to each section of the mapping table in the previous round of correlation.

In one embodiment, in simultaneously searching a first section of a mapping table and a second section of the mapping table, the process 1300 may simultaneously search the first section of the mapping table stored in a first bank of registers and the second section of the mapping table stored in a second bank of registers. For example, with reference to FIGS. 4A-4B, the first PRMT section 205a stored in the first bank of registers 202a and the second PRMT section 205b stored in the second bank of registers 202b may be searched simultaneously by the process 1300.

In one embodiment, the process 1300 may simultaneously search the first section of the mapping table stored in the first bank of registers in a first direction and in a second direction, the second direction being different from the first direction. The process 1300 may also simultaneously search the second section of the mapping table stored in a second bank of registers in the first direction and in the second direction. For example, the first PRMT section 205a stored in the first bank of registers 202a may be searched in the first and second directions simultaneously while the second PRMT section 205b stored in the second bank of registers 202b may be searched simultaneously in the first and second directions by the process 1300.

Figure 14:
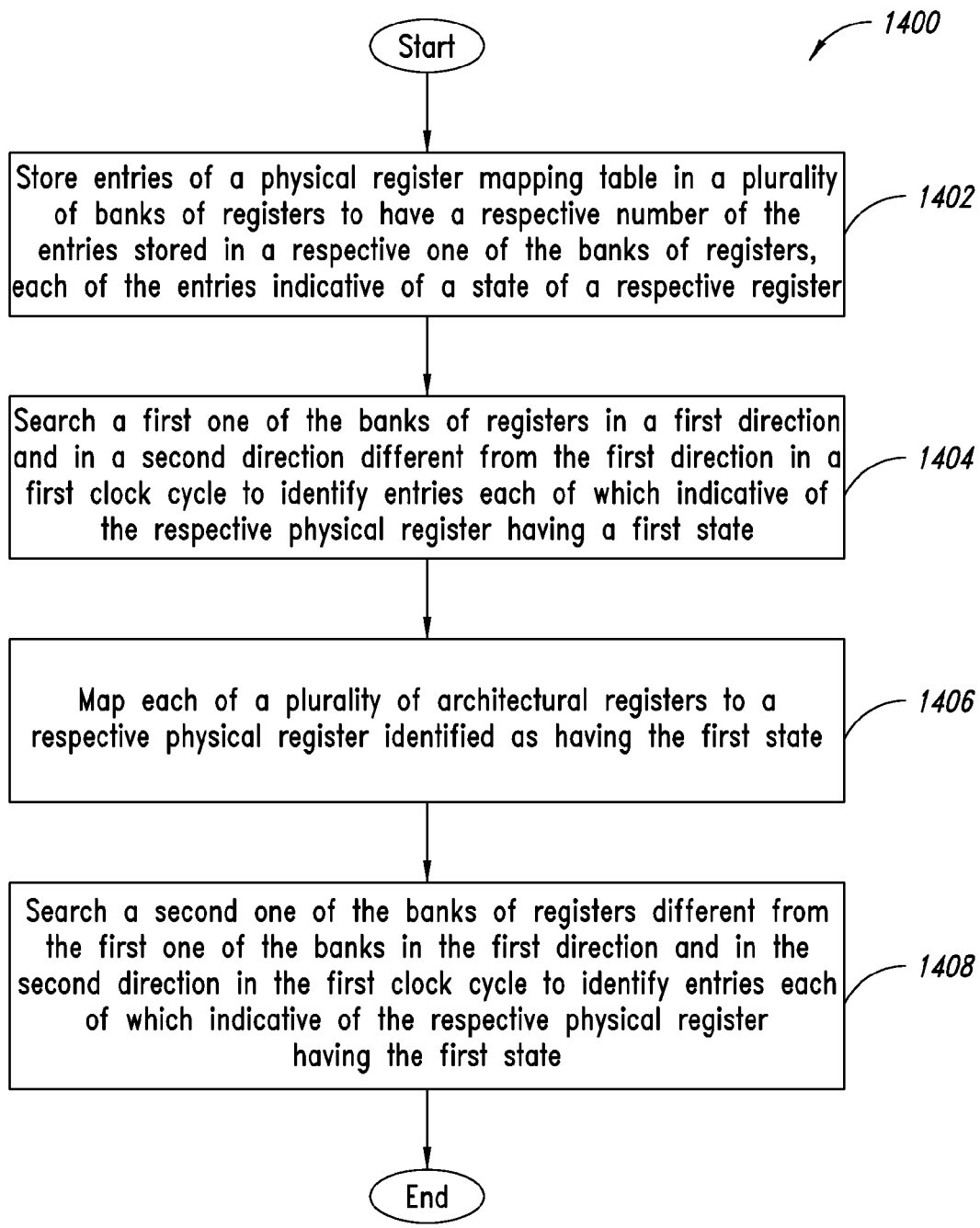
FIG. 14 is a flow chart illustrating a process of performing register renaming in a processor according to another non-limiting illustrated embodiment.

FIG. 14 illustrates a process 1400 of performing register renaming in a processor according to one embodiment. At 1402, entries of a physical register mapping table are stored in a plurality of banks of registers so that a respective number of the entries are stored in a respective one of the banks of registers. Each of the entries is indicative of a state of a respective physical register. At 1404, a first one of the banks of registers is searched in a first direction and simultaneously searched in a second direction different from the first direction. The searching occurs in a first clock cycle. The searching operates to identify entries each of which is indicative of the respective physical register being in a first state. At 1406, each of a plurality of architectural registers is mapped to a respective physical register identified as being in the first state.

In one embodiment, at 1408, the process 1400 may additionally search a second one of the banks of registers different from the first one of the banks. The second one of the banks may be searched in the first direction and simultaneously in the second direction. The searching may occur in the first clock cycle. The searching may operate to identify entries each of which is indicative of the respective physical register being in the first state.

In another embodiment, the process 1400 may additionally provide a plurality of signals; each signal representative of a respective register of the first one of the banks and each signal having a first value indicative of the respective register being in the first state. Alternatively, each signal may have a second value indicative of the respective register being in another state different from the first state. The signal may have the second value after searching the first one of the banks of registers to identify entries being in the first state.

In yet another embodiment, the process 1400 may additionally search a second one of the banks of registers in the first direction and simultaneously search the second one of the banks of registers in the second direction. The searching may occur in the first clock cycle. The searching operates to identify entries each of which is indicative of the respective physical register being in the first state. In mapping each of the plurality of architectural registers to a respective physical register identified as being in the first state, the process 1400 may map each of the plurality of architectural registers to a physical register associated with an entry stored in the first one or the second one of the banks.

In one embodiment, the process 1400 may store entries of the physical register mapping table in a first bank of registers and a second bank of registers. That is, entries of a first section of the physical register mapping table may be stored in the first bank and entries of a second section of the physical register mapping table may be stored in the second bank. In one embodiment, the process 1400 may search in each of the first and the second banks in the first direction and in the second direction. The searching may occur in the first clock cycle. The searching operates to identify particular entries, each of which is indicative of the respective physical register being in the first state. In one embodiment, the process 1400 may map a first architectural register to a physical register associated with one of the entries stored in the first bank. The process 1400 may further map a second architectural register to a physical register associated with one of the entries stored in the second bank.

In one embodiment, in mapping each of a plurality of architectural registers to a respective physical register identified as being in the first state, the process 1400 may map each of a plurality of architectural register identifiers to a respective entry associated with a physical register identified as being in the first state. The architectural register identifiers are each transmitted over a respective one of a plurality of transmission paths. More specifically, the process 1400 may map the architectural register identifiers, which are transmitted over a first and a second of the transmission paths. The mapping may occur in a second clock cycle that is after the first clock cycle. The architectural register identifiers are mapped to entries in the first bank being in the first state. The process 1400 may additionally map the architectural register identifiers, which are transmitted over the first and the second of the transmission paths in a third clock cycle. The third clock cycle is after the second clock cycle. The additional mapping of the architectural register identifiers is to entries in the second bank being in the first state. This mapping may be in response to a quantity of entries in the first bank identified as being in the first state being different from a quantity of entries in the second bank identified as being in the first state in a fourth clock cycle that is after the third clock cycle.

In one embodiment, the process 1400 may search from a first end of the first one of the banks of registers towards a second end of the bank opposite to the first end. The process 1400 may further search from the second end of the bank towards the first end of the bank in the first clock cycle.

Figure 15:
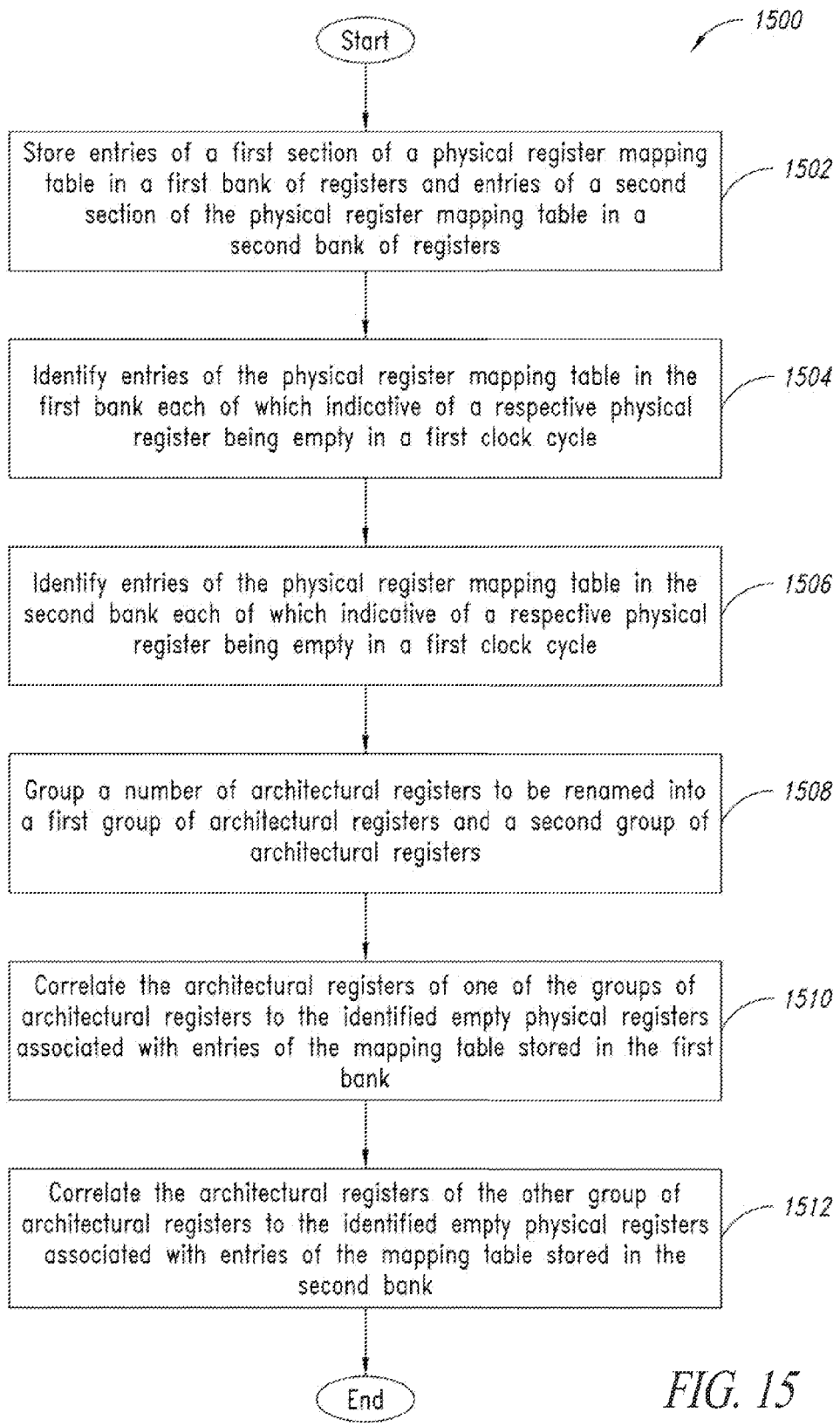
FIG. 15 is a flow chart illustrating a process of performing register renaming in a processor according to yet another non-limiting illustrated embodiment.

FIG. 15 illustrates a process 1500 of performing register renaming in a processor according to one embodiment. At 1502, entries of a first section of a physical register mapping table are stored in a first bank of registers and entries of a second section of the physical register mapping table are stored in a second bank of registers. At 1504, those entries of the physical register mapping table in the first bank, each of which is indicative of a respective physical register being empty, are identified in a first clock cycle. At 1506, those entries of the physical register mapping table in the second bank, each of which is indicative of a respective physical register being empty, are also identified in the first clock cycle. At 1508, a first number of architectural registers to be renamed are grouped into a first group of architectural registers and a second number of architectural registers to be renamed are grouped into a second group of architectural registers. At 1510, the architectural registers of one of the groups of architectural registers are correlated to the identified empty physical registers associated with entries of the mapping table stored in the first bank. At 1512, the architectural registers of the other group of architectural registers are correlated to the identified empty physical registers associated with entries of the mapping table stored in the second bank.

In one embodiment, the process 1500 may additionally balance correlation of the groups of architectural registers to physical registers associated with the identified empty entries in the first and the second banks. More specifically, the process 1500 may correlate each group of architectural registers to the respective identified empty physical registers associated with entries in the first or the second bank. The correlation in process 1500 occurs in response to a quantity of empty physical registers associated with the entries stored in the first bank and a quantity of empty physical registers associated with the entries stored in the second bank, The quantity of empty physical registers associated with the entries stored in the second bank are identified in a previous clock cycle.

In another embodiment, the process 1500 may additionally store an identifier of one of the architectural registers in a respective entry associated with one of the physical registers identified as empty. The process 1500 may also set a state of the respective entry to indicate a state of the respective physical register as other than being empty.

In one embodiment, in grouping a number of architectural registers to be renamed into a first group of architectural registers and a second group of architectural registers, the process 1500 may group the number of architectural registers to be renamed into the first group of architectural registers and the second group of architectural registers in a program order.

In one embodiment, the first and the second banks each have a respective first end and a respective second end opposite to the respective first end. The process 1500 may identify entries of the physical register mapping table in the first bank, each of which entries is indicative of a respective physical register being empty in the first clock cycle. The process 1500 may identify the entries by simultaneously searching from the first end towards the second end and searching from the second end towards the first end. The process 1500 may also identify entries of the physical register mapping table in the second bank, each of which entries is indicative of a respective physical register being empty in the first clock cycle. The process 1500 may identify the entries by simultaneously searching from the first end towards the second end and searching from the second end towards the first end.

In one embodiment, the process 1500 may identify up to two entries of the physical register mapping table in the first bank and up to two entries of the physical register mapping table in the second bank. The process 1500 may group four architectural registers to be renamed into a first couple of architectural registers and a second couple of architectural registers, with each group having a couple of the four architectural registers. The process 1500 may correlate the physical registers associated with the identified up to two entries in the first bank to one couple of architectural registers. The process 1500 may further correlate the physical registers associated with the identified up to two entries in the second bank to the other couple of architectural registers.

Thus, embodiments of an inventive implementation of register renaming system in processors, such as superscalar microprocessors, have been disclosed. The register renaming system according to the various embodiments disclosed herein provides several advantages over the conventional implementation of register renaming systems, such as the conventional register renaming system 100 shown in FIGS. 1A-1C. For instance, the path delay in finding empty physical registers can be reduced by searching multiple sections of the physical register mapping table in parallel, with each section being searched in two different directions. Reduced path delay should also advantageously result in reduced power consumption.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other context, not necessarily the exemplary context of register renaming generally described above. It will be understood by those skilled in the art that, although the embodiments described above and shown in the figures are generally directed to the context of register renaming, applications related to the use of physical registers in the processor may also benefit from the concepts described herein.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A register renaming system to correlate architectural registers to physical registers, comprising:
   a physical register mapping table having a plurality of entries, the plurality of entries configured as at least two non-overlapping sections of the physical register mapping table, wherein each entry in the physical register mapping table corresponds to a physical register, and each entry is configured to indicate that the corresponding physical register is in one of a plurality of states; and
   a renaming logic coupled to the physical register mapping table, the renaming logic configured to:
      search a number of the non-overlapping sections of the physical register mapping table in parallel,
      identify physical register mapping table entries that indicate the corresponding physical registers are in a first state, and
      selectively correlate each of a plurality of architectural registers to a respective plurality of physical registers identified as being in the first state.

2. The register renaming system of claim 1, further comprising:
   a plurality of banks of registers coupled to the renaming logic,
   wherein the banks of registers are configured to store the entries of the physical register mapping table,
   wherein each bank of registers is configured to store at least one of the at least two non-overlapping sections of the physical register mapping table, and
   wherein each register of each bank is configured to store a respective entry of the respective section of the physical register mapping table.

3. The register renaming system of claim 2 wherein the renaming logic includes a search logic configured to search the plurality of banks of registers, the search logic further configured to simultaneously search each of the banks in a first direction and a second direction, the second direction different from the first direction.

4. The register renaming system of claim 2 wherein the renaming logic includes a mapping logic configured to:
   receive a plurality of architectural register identifiers, each architectural register identifier representative of a respective one of the architectural registers, and
   selectively correlate each of the architectural register identifiers to a respective one of the entries of the physical register mapping table, the respective one entry indicative of the respective physical register being in the first state.

5. The register renaming system of claim 4 wherein the mapping logic selectively records each architectural register identifier in an architectural register entry of the physical register mapping table, the architectural register entry corresponding to the respective one entry indicative of the respective physical register being in the first state.

6. The register renaming system of claim 5 wherein the mapping logic changes the state of the respective one entry of the physical register mapping table configured to indicate that the corresponding physical register is in one of a plurality of states from the first state to another state different than the first state.

7. The register renaming system of claim 4 wherein the mapping logic balances selectively correlating architectural register identifiers to respective ones of the entries of each non-overlapping section of the physical register mapping table.

8. The register renaming system of claim 7 wherein the mapping logic adjusts a respective quantity of architectural register identifiers to be selectively correlated to entries of each non-overlapping section of the physical register mapping table based on a respective quantity of architectural register identifiers previously selectively correlated to entries of each non-overlapping section of the physical register mapping table.

9. The register renaming system of claim 4 wherein the search logic is coupled to the mapping logic, and the search logic is configured to provide a plurality of flag signals, each flag signal indicative of whether or not a respective register of the banks of registers has a respective entry stored therein indicative of the respective physical register being in the first state.

10. The register renaming system of claim 4 wherein the mapping logic is further configured to:
organize the architectural register identifiers into groups of architectural register identifiers,
correlate each group of architectural register identifiers to entries of a respective non-overlapping section of the physical register mapping table in a first round of correlation, and
correlate each group of architectural register identifiers to entries of a different non-overlapping section of the physical register mapping table in a second round of correlation after the first correlation,
wherein the second round of correlation is based on a respective quantity of architectural register identifiers correlated to entries of each section of the physical register mapping table in the first round of correlation.

11. A register renaming system in a processor, comprising:
a first bank of registers, each register of the first bank of registers configured to store a respective entry of a first section of a physical register mapping table, each respective entry of the first section configured to store one state of a plurality of states, the one state indicative of a state of a respective physical register, the respective physical register corresponding to the respective entry of the first section;
a second bank of registers, each register of the second bank of registers configured to store a respective entry of a second section of the physical register mapping table, each respective entry of the second section configured to store one state of the plurality of states, the one state indicative of a state of a respective physical register, the respective physical register corresponding to the respective entry of the second section; and
a search logic coupled to the first and the second banks of registers, the search logic configured to:
search the first and the second banks of registers in parallel, and
identify registers in the first and the second banks that are storing a respective entry of the physical register mapping table indicative of the respective physical register being in a first state.

12. The register renaming system of claim 11 wherein the search logic is further configured to:
search the first bank of registers in a first direction and simultaneously search the first bank in a second direction, the second direction different from the first direction,
search the second bank of registers in the first direction and simultaneously search the second bank in the second direction, and
identify registers having a respective entry indicative of the respective physical register being in the first state.

13. The register renaming system of claim 11, further comprising:
an assignment logic configured to receive and group a number of architectural register identifiers into first and second groups of architectural register identifiers, the assignment logic further configured to provide the architectural register identifiers as the first and the second groups of architectural register identifiers, wherein each architectural register identifier is representative of a respective architectural register, and wherein each of the received architectural register identifiers is in either the first group or the second group.

14. The register renaming system of claim 13, further comprising:
an allocation logic coupled to the first and the second banks of registers, the search logic, and the assignment logic, the allocation logic configured to:
receive the first and the second groups of architectural register identifiers from the assignment logic, and
selectively correlate each of the architectural register identifiers to a respective one of the entries in the first or the second bank of registers.

15. The register renaming system of claim 14 wherein the search logic is configured to provide a plurality of flag signals to the allocation logic, each of the flag signals having a first value to indicate the respective physical register has the first state or each of the flag signals having a second value to indicate the respective physical register has another state other than the first state.

16. The register renaming system of claim 15 wherein the allocation logic is configured to:
receive the flag signals from the search logic,
store each of the architectural register identifiers in a respective register of the first or the second bank of registers, and
direct the allocation logic to correlate the respective architectural register to the respective physical register when the respective flag signal has the first value.

17. The register renaming system of claim 14 wherein the allocation logic is further configured to:
correlate each of the architectural register identifiers in the first group to a respective one of the entries in the first bank of registers, and
correlate each of the architectural register identifiers in the second group to a respective one of the entries in the second bank of registers.

18. The register renaming system of claim 17 wherein the allocation logic is further configured to:
correlate each of the architectural register identifiers in the first group to a respective one of the entries in the second bank of registers, and
correlate each of the architectural register identifiers in the second group to a respective one of the entries in the first bank of registers if a number of architectural register identifiers correlated to entries in the first bank is not equal to a number of architectural register identifiers correlated to entries in the second bank in a previous round of correlation.

19. The register renaming system of claim 14 wherein the search logic is further configured to:
   determine the quantity of the registers identified as having a respective entry of the physical register mapping table indicative of the respective physical register being in the first state, and
   provide a respective validity signal for each of the identified registers to the allocation logic.

20. The register renaming system of claim 19 wherein, for each of the first and the second banks of registers, the allocation logic is configured to:
   receive respective first and respective second architectural register identifiers, and
   determine which of the received first and second architectural register identifiers is to be correlated if only one entry stored in the respective bank of registers is identified as indicative of the respective physical register being in the first state.

21. A processor, comprising:
   a physical register mapping table having a plurality of entries, each entry of the physical register mapping table indicative of a state of a respective physical register;
   a search logic coupled to the physical register mapping table, the search logic configured to search a plurality of sections of the physical register mapping table in parallel, the search logic operable to identify entries that are indicative of the respective physical register being in a first state, wherein each section of the physical register mapping table that is searched by the search logic is configured to have respective entries of the physical register mapping table different from the entries of another section of the physical register mapping table that is searched by the search logic; and
   a mapping logic coupled to the search logic, the mapping logic configured to receive a number of architectural register identifiers, each architectural register identifier indicative of a respective architectural register, the mapping logic operable to map each received architectural register identifier to a respective entry in a respective section of the physical register mapping table that indicates the respective physical register is in the first state.

22. The processor of claim 21, further comprising:
   a plurality of banks of registers, each bank configured to store a respective section of the physical register mapping table such that each register of the bank is configured to store a respective entry of the respective section of the physical register mapping table, wherein the search logic is configured to search the plurality of banks of registers in parallel for registers storing entries of the physical register mapping table, the entries indicating that the respective physical registers are in the first state.

23. The processor of claim 22 wherein the search logic is coupled to the banks of registers and the search logic is configured to:
   search each of the banks of registers simultaneously from a first end of the bank towards a second end of the bank, the second end opposite to the first end,
   search from the second end of the bank towards the first end of the bank, and
   search for registers storing entries of the physical register mapping table indicative of the respective physical registers being in the first state.

24. The processor of claim 22 wherein the search logic is configured to provide a plurality of flag signals to the mapping logic, each flag signal indicative of a search result for a respective register of the banks of registers, each flag signal configured to have a first value or a second value, the first value to indicate the respective register stores a respective entry of the physical register mapping table indicative of the respective physical register being in the first state, and the second value to indicate the respective register stores a respective entry of the physical register mapping table indicative of the respective physical register being in another state other than the first state.

25. The processor of claim 22 wherein the search logic includes a plurality of register search logics, each of the register search logics coupled to a respective one of the banks of registers, each of the register search logics configured to simultaneously search the registers of the respective bank from a first end of the bank towards a second end of the bank, the second end of the bank opposite to the first end of the bank, and each of the register search logics configured to search from the second end of the bank towards the first end of the bank, the register search logics configured to search for registers storing entries of the physical register mapping table indicative of the respective physical registers being in the first state.

26. A processor-based system, comprising:
   an input device;
   an output device;
   a data storage device; and
   a processor coupled to the input device, the output device, and the data storage device, the processor including:
      a plurality of banks of registers, each bank of registers configured to store a section of a physical register mapping table, the physical register mapping table configured to store a respective entry of the physical register mapping table in each register of a respective bank of registers, each entry of the physical register mapping table indicative of a state of a respective physical register;
      a search logic coupled to the banks of registers, the search logic configured to search a first bank and a second bank of the banks of registers simultaneously, the search logic further configured to identify registers of the first bank and the second bank that store a respective entry indicative of the respective physical register being in a first state; and
      a mapping logic coupled to the banks of registers and the search logic, the mapping logic configured to receive a number of architectural register identifiers, each architectural register identifier identifying a respective architectural register, the mapping logic further configured to map each architectural register identifier to a respective one of the registers in the first bank and the second bank, the respective one of the registers in the first bank and the second bank identified as storing a respective entry indicative of the respective physical register being in the first state, the mapping logic operable to correlate each architectural register to a corresponding physical register.

27. The processor-based system of claim 26 wherein the search logic is configured to simultaneously search at least one of the first and the second banks of registers in a first direction and a second direction, the second direction different from the first direction, the search operable to identify registers of the at least one of the first and the second banks of registers that store a respective entry indicative of the respective physical register being in the first state.

28. The processor-based system of claim 27 wherein the processor further comprises:
   an assignment logic coupled to the mapping logic, the assignment logic configured to:
      receive the architectural register identifiers, allocate the architectural register identifiers into a number of groups, and provide the architectural register identifiers in groups to the mapping logic.

29. The processor-based system of claim 28 wherein the mapping logic is further configured to:

determine the number of architectural register identifiers mapped to each of the first and the second banks of registers in each round of correlation, and balance the number of architectural register identifiers mapped to each of the first and the second banks of registers in each round of correlation, the balancing based on the number of architectural register identifiers mapped to each of the first and the second banks of registers in a previous round of correlation.

30. The processor-based system of claim 26 wherein the search logic is configured to:

receive an empty signal for each register of the banks of registers, the empty signal indicative of the state of the physical register associated with the respective entry of the physical register mapping table stored in the respective register, and provide a flag signal for each empty signal to indicate the state of the respective physical register, the flag signal having a first value to indicate the respective physical register is in the first state or a second value to indicate the respective physical register is in another state other than the first state.

31. A method of performing register renaming in a processor, the method comprising:

simultaneously searching a first section of a mapping table and a second section of the mapping table, the searching operable to identify entries of the mapping table each of which is indicative a respective physical register being in a first state; and storing data for a number of architectural registers, the data related to each of the number of architectural registers in a respective one of the physical registers identified as being in the first state, the storing operable to correlate the number of architectural registers to the physical registers identified as being in the first state.

32. The method of claim 31 wherein simultaneously searching the first section of the mapping table and the second section of the mapping table comprises simultaneously searching the first section of the mapping table stored in a first bank of registers and the second section of the mapping table stored in a second bank of registers.

33. The method of claim 32 wherein simultaneously searching the first section of the mapping table stored in the first bank of registers and the second section of the mapping table stored in the second bank of registers comprises:

simultaneously searching the first section of the mapping table stored in the first bank of registers in a first direction and in a second direction, the second direction different from the first direction; and simultaneously searching the second section of the mapping table stored in the second bank of registers in the first direction and in the second direction.

34. The method of claim 31, further comprising:

balancing the correlation of the architectural registers to the physical registers identified as being in the first state in each round of correlation, the balancing based on the correlation of the architectural registers to ones of the physical registers identified as being in the first state in a previous round of correlation.

35. The method of claim 34 wherein balancing the correlation comprises:

determining the quantity of architectural registers correlated to physical registers that are related to each section of the mapping table for each round of correlation; and adjusting the quantity of architectural registers to be correlated to physical registers related to each section of mapping table entries based on the quantity of architectural registers correlated to physical registers related to each section of the mapping table in the previous round of correlation.

36. A method of performing register renaming in a processor, the method comprising:

storing entries of a physical register mapping table in a plurality of banks of registers so that a respective number of the entries are stored in a respective one of the banks of registers, each of the entries indicative of a state of a respective physical register;

searching a first one of the banks of registers in a first direction and searching the first one of the banks in a second direction, the second direction different from the first direction, the searching occurring in a first clock cycle, the searching to identify entries each of which is indicative of the respective physical register being in a first state; and mapping each of a plurality of architectural registers to a respective physical register identified as being in the first state.

37. The method of claim 36, further comprising:

searching a second one of the banks of registers different from the first one of the banks, the searching in the first direction and in the second direction, the searching occurring in the first clock cycle to identify entries each of which is indicative of the respective physical register being in the first state.

38. The method of claim 36 wherein storing entries of the physical register mapping table in the plurality of banks of registers to have the respective number of the entries stored in the respective one of the banks of registers comprises:

storing entries of the physical register mapping table in the first bank of registers and the second bank of registers such that entries of a first section of the physical register mapping table are stored in the first bank and entries of a second section of the physical register mapping table are stored in the second bank.

39. The method of claim 38 wherein searching the first one of the banks of registers in the first direction and searching the first one of the banks in the second direction, the second direction different from the first direction, the searching occurring in the first clock cycle, the searching to identify entries each of which is indicative of the respective physical register being in the first state comprises:

searching in each of the first and the second banks in the first direction and in the second direction, the searching occurring in the first clock cycle, the searching to identify entries each of which indicative of the respective physical register being in the first state.

40. The method of claim 39 wherein mapping each of the plurality of architectural registers to the respective physical register identified as being in the first state comprises:

mapping a first architectural register to a physical register associated with one of the entries stored in the first bank and mapping a second architectural register to a physical register associated with one of the entries stored in the second bank.

41. The method of claim 36 wherein mapping each of the plurality of architectural registers to the respective physical register identified as being in the first state comprises:

mapping each of a plurality of architectural register identifiers each transmitted over a respective one of a plurality of transmission paths to a respective entry associated with a physical register identified as being in the first state.

42. The method of claim 41 wherein mapping each of the plurality of architectural register identifiers each transmitted over the respective one of the plurality of transmission paths to the respective entry associated with the physical register identified as being in the first state comprises:
   mapping the architectural register identifiers to entries in the first bank being in the first state, the architectural register identifiers transmitted over a first and a second of the transmission paths in a second clock cycle that is after the first clock cycle; and
   mapping the architectural register identifiers to entries in the second bank being in the first state, the architectural register identifiers transmitted over the first and the second of the transmission paths in a third clock cycle that is after the second clock cycle, the mapping in response to a quantity of entries in the first bank identified as being in the first state being different from a quantity of entries in the second bank identified as being in the first state in a fourth clock cycle that is before the third clock cycle.

43. The method of claim 36 wherein searching the first one of the banks of registers in the first direction and searching the first one of the banks of registers in the second direction, the second direction different from the first direction, the searching occurring in the first clock cycle comprises:
   searching from a first end of the first one of the banks of registers towards a second end of the first one of the banks, the second end opposite to the first end, and
   searching from the second end of the first one of the banks towards the first end of the first one of the banks in the first clock cycle.

44. The method of claim 36, further comprising:
   after searching the first one of the banks of registers to identify entries being in the first state, providing a plurality of signals each of the plurality of signals representative of a respective register of the first one of the banks and each of the plurality of signals having a first value or a second value, the first value indicative of the respective register being in the first state and the second value indicative of the respective register being in another state different from the first state.

45. The method of claim 36, further comprising:
   searching a second one of the banks of registers in the first direction and in the second direction, the searching occurring in the first clock cycle, the searching operable to identify entries each of which entries is indicative of the respective physical register being in the first state, and wherein mapping each of the plurality of architectural registers to a respective physical register identified as being in the first state includes mapping each of the plurality of architectural registers to a physical register associated with an entry stored in the first one or the second one of the banks.

46. A method of performing register renaming in a processor, the method comprising:
   storing entries of a first section of a physical register mapping table in a first bank of registers and entries of a second section of the physical register mapping table in a second bank of registers;
   identifying entries of the physical register mapping table in the first bank, each of which entries is indicative of a respective physical register being empty, the identifying occurring in a first clock cycle;
   identifying entries of the physical register mapping table in the second bank, each of which entries is indicative of a respective physical register being empty, the identifying occurring in the first clock cycle;
   grouping a first number of architectural registers to be renamed into a first group of architectural registers and a second number of architectural registers to be renamed into a second group of architectural registers;
   correlating the architectural registers of one of the first and second groups of architectural registers to the identified empty physical registers associated with entries of the physical register mapping table stored in the first bank; and
   correlating the architectural registers of the other group of the first and second groups of architectural registers to the identified empty physical registers associated with entries of the physical register mapping table stored in the second bank.

47. The method of claim 46 wherein the first bank of registers and the second bank of registers each have a respective first end and a respective second end, the respective second end opposite to the respective first end, and wherein identifying entries of the physical register mapping table in the first bank comprises:
   simultaneously searching from the respective first end towards the respective second end and searching from the respective second end towards the respective first end.

48. The method of claim 47 wherein identifying entries of the physical register mapping table in the second bank comprises:
   simultaneously searching from the respective first end towards the respective second end and searching from the respective second end towards the respective first end.

49. The method of claim 46 wherein identifying entries of the physical register mapping table in the first bank includes identifying up to two entries of the physical register mapping table in the first bank, and identifying entries of the physical register mapping table in the second bank includes identifying up to two entries of the physical register mapping table in the second bank.

50. The method of claim 49 wherein grouping the first number of architectural registers to be renamed into the first group of architectural registers and the second number of architectural registers to be renamed into the second group comprises:
   grouping four architectural registers to be renamed into a first couple of architectural registers and a second couple of architectural registers.

51. The method of claim 50 wherein correlating the architectural registers of one of the first and second groups of architectural registers includes correlating the physical registers associated with the identified up to two entries in the first bank to one couple of architectural registers, and correlating the architectural registers of the other group of architectural registers includes correlating the physical registers associated with the identified up to two entries in the second bank to the other couple of architectural registers.

52. The method of claim 46 wherein grouping the first number of architectural registers to be renamed into the first group of architectural registers and the second number of architectural registers to be renamed into the second group comprises:

grouping the number of architectural registers to be renamed into the first group of architectural registers and the second group of architectural registers in a program order.

53. The method of claim 46, further comprising:
balancing correlation of the groups of architectural registers to physical registers associated with the identified empty entries in the first and the second banks.

54. The method of claim 53 wherein balancing correlation comprises:
correlating each group of architectural registers to the respective identified empty physical registers associated with entries in the first or the second bank in response to a quantity of empty physical registers associated with the entries stored in the first bank and a quantity of empty physical registers associated with the entries stored in the second bank identified in a previous clock cycle.

55. The method of claim 46, further comprising:
storing an identifier of one of the architectural registers in a respective entry associated with one of the physical registers identified as empty; and
setting a state of the respective entry to indicate a state of the respective physical register as other than being empty.

* * * * *